US008660973B1

(12) United States Patent
Feigenbaum

(10) Patent No.: US 8,660,973 B1
(45) Date of Patent: Feb. 25, 2014

(54) SYSTEMS AND METHODS FOR COGNITION-BASED PROCESSING OF KNOWLEDGE

(76) Inventor: Thomas D Feigenbaum, Carmel, IN (US)

( * ) Notice: Subject to any disclaimer, the term of this patent is extended or adjusted under 35 U.S.C. 154(b) by 345 days.

(21) Appl. No.: 13/048,689

(22) Filed: Mar. 15, 2011

Related U.S. Application Data

(60) Provisional application No. 61/313,931, filed on Mar. 15, 2010.

(51) Int. Cl.
*G06F 17/00* (2006.01)
*G06N 5/02* (2006.01)

(52) U.S. Cl.
USPC .................. 706/47; 706/54; 706/55

(58) Field of Classification Search
None
See application file for complete search history.

(56) References Cited

U.S. PATENT DOCUMENTS

| | | | |
|---|---|---|---|
| 5,594,837 A | 1/1997 | Noyes | |
| 5,835,905 A | 11/1998 | Pirolli et al. | |
| 6,081,797 A | 6/2000 | Hittt | |
| 6,151,595 A | 11/2000 | Pirolli et al. | |
| 6,389,405 B1 | 5/2002 | Oatman et al. | |
| 6,993,535 B2 | 1/2006 | Bolle et al. | |
| 7,343,365 B2 | 3/2008 | Farnham et al. | |
| 7,349,840 B2 | 3/2008 | Budzinski | |
| 7,599,902 B2 | 10/2009 | Fox et al. | |

OTHER PUBLICATIONS

Darakapalli, P., "Visualization of Knowledge Representation & Distributed Activation Spreading in Long-Term Memory." Master Thesis submitted at the Department of Informatics of the University of Bremen, Matr. Nr. 1696276, Jul. 29, 2005; (98 pages).

Ziegler, C. and Lausen, G., "Spreading Activation Models for Trust Propagation," eee, pp. 83-97, 2004. IEEE International Cofnerence on e-Technology, e-Commerce and e-Service (EEE'04), 2004; (15 pages).

Liu, W., Scharl, A., and Chang, E., "Semi-Automatic Ontology Extension Using Spreading Activation." *Journal of Universal Knowledge Management*, vol. 0, No. 1 (2005), 50-58, Jun. 28, 2005, © J.UKM; (9 pages).

Katifori, A., Vassilakis, C., and Dix, A., "Ontologies and the Brain: Using Spreading Activation through Ontologies to Support Personal Interaction." *Cognitive Systems Research*, 11 (2010) 25-41; (30 pages).

(Continued)

*Primary Examiner* — Kakali Chaki
*Assistant Examiner* — Luis Sitiriche
(74) *Attorney, Agent, or Firm* — Faegre Baker Daniels LLP

(57) ABSTRACT

The present invention involves a system for processing and acting on information comprising a processor and associated storage with a plurality of knowledge units. Each knowledge unit includes at least one item of data or a sequence of further knowledge units. An observation software module obtains experiential data from external events and stores experiential data in a Universe of Information Units. An operator software module acts on information units in a plurality of operations including at least one of: conditional association, causal relationship, assignment of a value, editing operation, self-observation, shock initiation, shock resistance, threshold determination, and generalization. A dynamic engine software module coordinates interaction of the observation and operator software modules and modifies contents of the knowledge units. An energy software module directs activation of at least one knowledge unit. A goal software module applies rules for determining actions of the dynamic engine module. An object software module encapsulates information units. A domain software module provides a predetermined set of information units relating to a particular domain, and has a rules software module that determines dynamic rules for the predetermined set of information units.

23 Claims, 29 Drawing Sheets

(56) References Cited

OTHER PUBLICATIONS

Hatzilygeroudis, I., and Prentzas, J., "Neuro-Symbolic Approaches for Knowledge Representation in Expert Systems." *International Journal of Hybrid Intelligent Systems* 1(3-4) (2004) 111-126; (16 pages).

Bier, E., Ishak, E., and Chi, E., "Entity Workspace: an evidence file that aids memory, intference, and reading." IEEE International Conference on Intelligence and Security Informatics (ISI 2006); May 22-24, 2006; San Diego; CA. Berlin: Springer Verlag (2006); LNCS 3975: 466-472; (13 pages).

Choudhury, S., Breslin, J., and Passant, A1, "Enrichment and Ranking of the YouTube Space and Integration with the Linked Data Cloud." The Semantic Web—ISWC 2009, Lecture Notes in Computer Science, vol. 5823. ISBN 978-3-642-04929-3. Springer-Verlag Berlin Heidelberg, 2009. p. 747; (16 pages).

Hussein, T., Westheide, D., and Ziegler, J., "Context-adaptation based on Ontologies and Spreading Activation." In Proceedings of LWA (2007), pp. 361-366; (6 pages).

Hori, Y., Nakayama, T., and Imai, Y., "Constructing Student Personal Course Scheduling Problem with Spreading Activation on a Course Network." Proceedings of the International Multiconference of Engineers and Computer Scientists 2010 vol. I, IMECS 2010, Mar. 17-19, 2010, Hong Kong; (6 pages).

Simko, M. and Bieliková, M., "Automatic Concept Relationships Discovery for an Adaptive E-course." Educational Data Mining (2009); (9 pages).

Hussein, T., and Ziegler, J., "Adapting web sites by spreading activation in ontologies." In: ReColl 2008: Int. Workshop on Recommendation and Collaboration (in conjunction with IUI 2008). Gran Canaria (2008); (8 pages).

Hasan, M., "A Spreading Activation Framework for Ontology-enhanced Adaptive Information Access within Organisations." In Proceedings AAAI Spring Symposium on Agent Mediated Knowledge Management AMKM 2003, Stanford University, CA, USA; (6 pages).

Liao, Y., Vemuri, V., and Pasos, A., "A General Framework for Adaptive Anomaly Detection with Evolving Connectionist Systems." Proceedings fo the Fourth SIAM International conference on Data Mining, Lake Buena Vista, FL, USA, Apr. 22-24, 2004; (5 pages).

Sidani, T., and Gonzalez, A., "A Framework for Learning Implicit Expert Knowledge through Observation." (2000). Transactions of the Society for Computer Simulation; (36 pages).

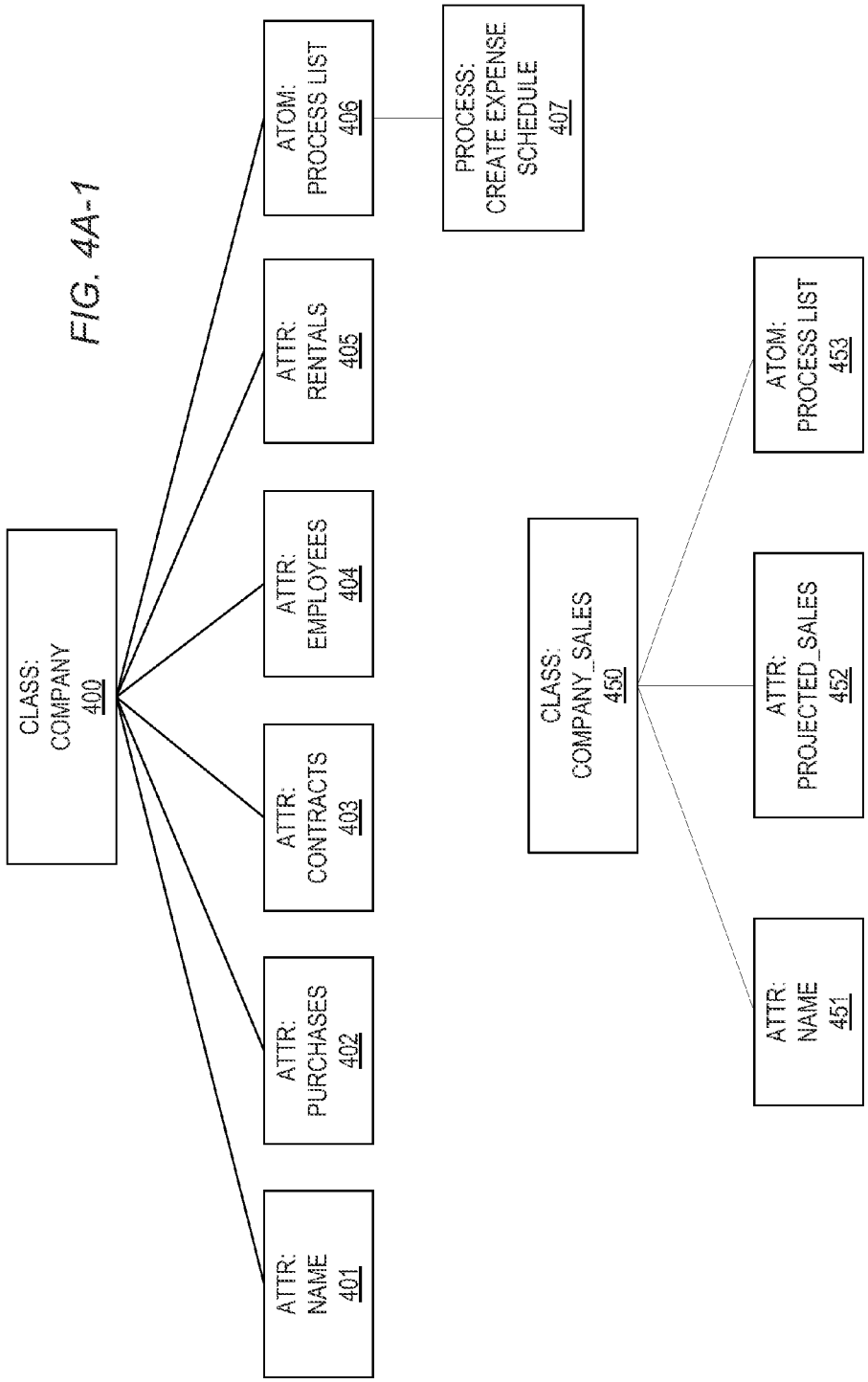

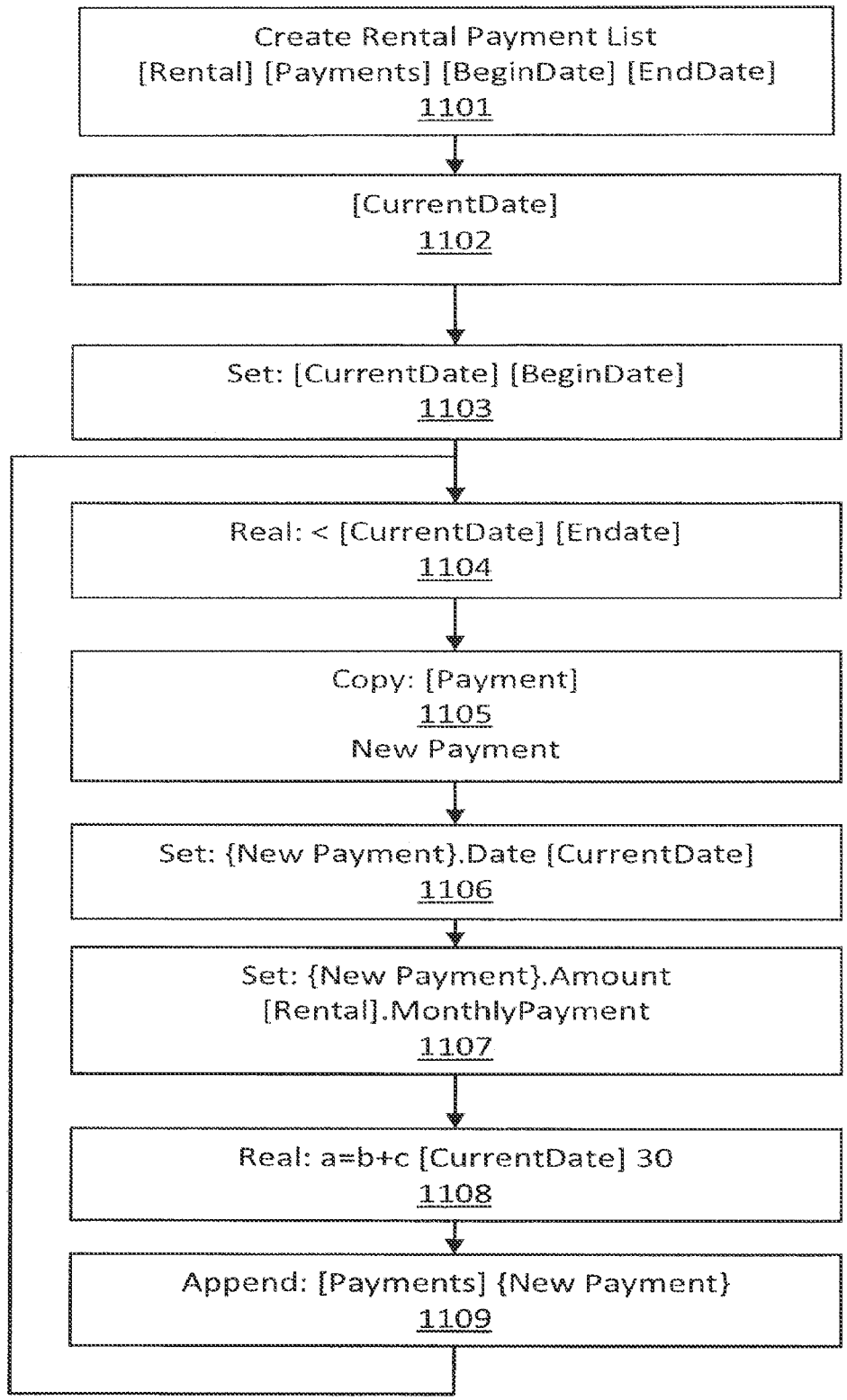

SYSTEMS AND METHODS FOR COGNITION-BASED PROCESSING OF KNOWLEDGE

CROSS-REFERENCE TO RELATED APPLICATION

This application claims the benefit under 35 U.S.C. §119 of U.S. Provisional Application No. 61/313,931, filed Mar. 15, 2010, the disclosure of which is expressly incorporated herein by reference.

BACKGROUND

1. Field of the Inventions

The field of the invention relates generally to automated processing of knowledge and more particularly to application of an abstract model of information that provides certain advantages in access, visualization, discovery and processing.

2. Background Information

Automation of information processing has been a goal of inventions and machine design since humans conceived and built the earliest apparatus. Seeking advanced processing schemes continues to be a field of great interest and with great potential to advance scientific understanding and be employed to generate wealth and benefit humanity.

With the advent of computing machinery, advances in available technologies such as computing power, ready availability of processing, disk storage and data networks have created an interesting set of circumstances. These new technologies make possible the implementation of many models of information processing that previously could only be conceptual or thought experiments. However, the same technology has also enabled the creation and storage of massive amounts of stored data and information, in turn creating a need for advanced and automated techniques to process the large quantity stored data.

The modeling of information and cognition is useful in many of the sciences, including computer understanding, cognitive sciences, neurobiology, macro-conscious organizations, education, decision support systems and fundamental physics. Modeling and automation of information processes according to specialized models has been proposed as a key to understanding consciousness and endowing computers with higher order cognitive functions and understanding, perhaps allowing computers to make discoveries and attain capabilities matching or exceeding human limits.

The term Artificial Intelligence (AI) broadly covers research and implementation directed at allowing machines to exhibit human-like cognition abilities including thought, comprehension, reasoning, learning, problem solving, abstraction, observation and explanation. Any attempt to make machines behave in a human-like way or show intelligent behavior is often described as artificial intelligence.

Many conventional approaches to artificial intelligence separate the AI implementation into two areas: a knowledge base and a knowledge engine. The knowledge base captures knowledge about a particular domain in a machine-usable format. The knowledge engine applies the knowledge base. In other terms the knowledge base is analogous to logic or rules while the knowledge engine is functional instructions, algorithms and processing instructions that apply the logic. However, many AI implementations blur the distinction between logic and application. For example, logic may include processing instructions.

Designing and building a knowledge base is a primary activity of knowledge engineering. The term knowledge engineering was first used by Edward Feigenbaum in 1983. Feigenbaum defined knowledge engineering as an engineering discipline that involves integrating knowledge into computer systems in order to solve complex problems normally requiring a high level of human expertise. Often domain experts provide knowledge for a knowledge base, and the expert knowledge may be converted into the knowledge base automatically or by human action. A particular challenge is encoding the knowledge in a format that makes it readily accessible both in an AI application and to maintainers and creators.

One conventional approach to designing a knowledge base captures the knowledge in a sequence of rules, each rule comprising an antecedent part and a consequent part. The antecedent is a series of conditions that, when satisfied, trigger the actions specified in the consequent part. The rules are then processed against a set of input data to yield one or more final conclusions. Although rule-based expert systems have achieved success in limited domains, a challenge is capturing the domain knowledge in a series of rules. Most conventional systems have required a domain expert to work with a knowledge engineer to capture the rules. Another challenge facing rule-based systems is applying the rules in an expedient manner, limiting use of rule-based systems in time-critical systems. It is often debated whether human experts use rules in reaching conclusions and correspondingly the value of automated application of rules.

A conventional approach to building a model of domain knowledge is training, wherein an automated observer examines a series of events and conditions, consequently constructing a model of the domain knowledge based on the observations. In supervised learning (also called reinforcement training) a teacher or other source of expertise guides the training by providing correct outcomes. In unsupervised learning the automated learning system looks for patterns or features in a data set without guidance. Some conventional systems have attempted to automatically build rules from observed data.

Another approach to artificial intelligence employs an artificial neural network. Networks of biological neurons comprise much of the brain of humans and other creatures. Artificial neural networks use analogous principles, using computing algorithms or hardware to implement artificial nodes or neurons that interconnect. Each node may receive stimulation from its input network and when adequately stimulated, the node "fires" and delivers stimulation to nodes connected to its output. The connections and firing thresholds determine the function of the network. Neural networks may be generalized to the field of connectionism.

Although early work in neural networks focused on emulating biological system structures and functions, much modern work is based on signal processing and statistics. A problem with neural networks is the requirement that they be trained on a knowledge domain. Training may be time-consuming and the knowledge gained is specific to the training data. Thus artificial neural networks do not generalize or gain the ability to address data outside the training domain. Neural networks have achieved success in limited domains such as control systems.

Classifiers are automated systems for dividing a set of data into classes, recognizing patterns in data, and in general automatically identifying relations in a dataset. Such relations may include correlations, rankings, clusters and features. Many classifiers are implemented using kernel methods or support vector machines. Kernel methods have achieved some success in fields such as handwriting analysis and automated character recognition.

Verification and validation is another challenge of computer-based intelligent systems. Many mission-critical systems require intensive testing to verify that a system meets a specification and also validate that the system performs as expected before the system may be deployed. This testing is difficult when the knowledge is captured in a format not easily understood by humans and the system behavior is complex or non-linear, as is often the case with automated cognitive implementations.

Other related fields are cognitive modeling, information theory, and Kolmogorov complexity.

SUMMARY OF THE INVENTION

The present invention relates to a computer implemented model which describes the elements, structures and processes present during intelligent thought and information processing. The model and its computer implementation is intended to be fundamental in its simplicity (consisting of only a few elements) and generality (ability to accurately represent the immense variety of experience encountered in this area). The methodology has both a formal description and application to several fields of human endeavor, including scientific disciplines and information processing technology.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein

FIGS. 4A-4F illustrate an embodiment of the present invention applied to the domain of operations of a business.

FIG. 11 shows a flow chart describing a payment list creating process according to another embodiment of the present invention.

Figure 1:
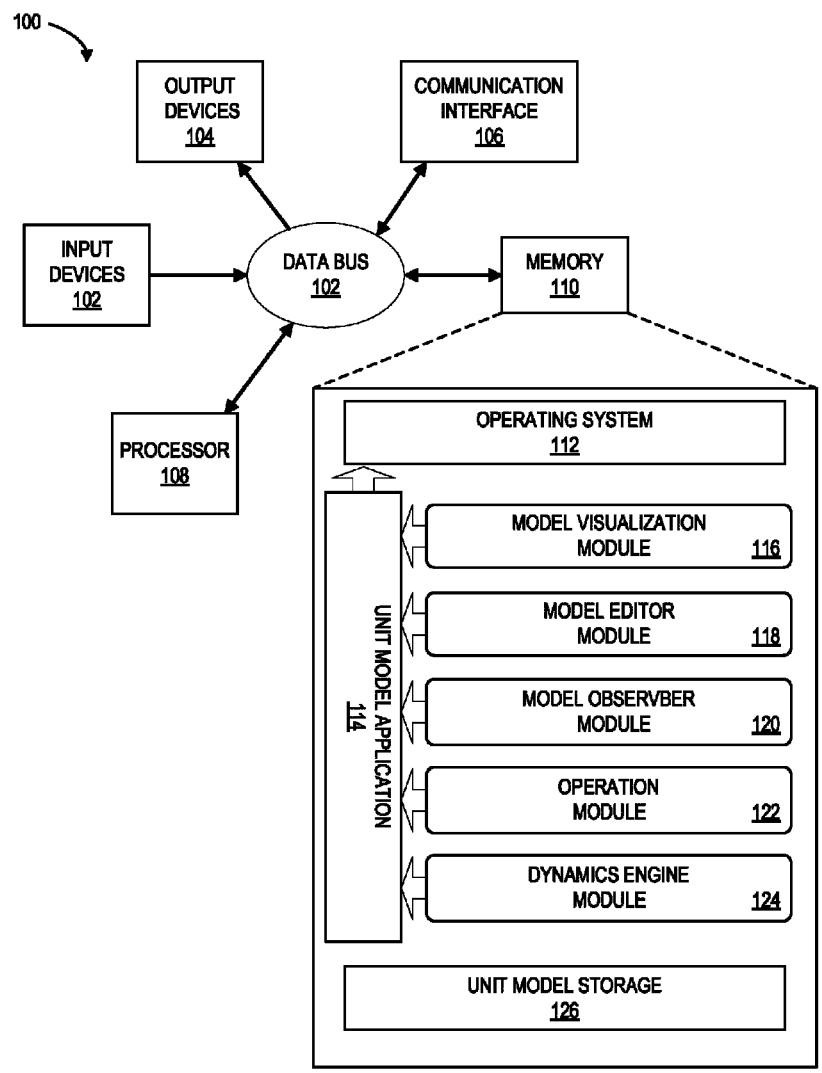
FIG. 1 is a schematic representation of a computer system implementing an embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF EMBODIMENTS OF THE INVENTION

In the descriptions and drawings that follow a small number of components and connections are sometimes shown to facilitate explanation and illustration. The number of components used herein is for example only. It should be understood that these examples do not describe the ultimate capability of the invention, including quantity of components, number of instances or interconnections that are possible. The embodiments disclosed below are not intended to be exhaustive or limit the invention to the precise form disclosed in the following detailed description. Rather, the embodiments are chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of a instruction.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

In the following description, several terms which are used frequently have specialized meanings in the present context. The terms "windowing environment", "running in windows", and "graphic user interface operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks may access the network resources, such as shared data files, common peripheral devices, and interwork station communication. Users activate computer programs or network resources to create processes which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The terms "windows" and associated terms such as "windowing environment" or "running in windows" defined above refer to a computer user interface, exemplified by the several windowing systems available from Microsoft Corporation of Redmond, Wash. Other windows computer interfaces are available, for example from Apple Computers Incorporated of Cupertino, Calif. and as components of the Linux operating environment. In particular it should be understood that the use of these terms in the descriptions herein does not imply a limitation to any particular computing environment or operating system.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output.

The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a worldwide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

In wireless wide area networks, communication primarily occurs through the transmission of radio signals over analog, digital cellular, or personal communications service ("PCS") networks. Signals may also be transmitted through microwaves and other electromagnetic waves. The electromagnetic waves used for communication may include "optical" waves at visual or near-visual frequencies, transmitted through free space or using "optical fibers" as a waveguide. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data (CDPD") used on the Advance Mobile Phone Service ("AMPS"). The terms "wireless application protocol" or "WAP" mean a universal specification to facilitate the delivery and presentation of web-based data on handheld and mobile devices with small user interfaces.

The term "real-time" (also "realtime") or "near real-time" means a system design approach that uses timing as a primary design objective. In particular, a real-time system completes one or more operations within a time interval that meets predetermined criteria. The term may also be used to refer to an operation performed, for example an "update in real-time." The time interval criteria may be a specific amount of time, or may be defined in contrast to another non-real-time system, sometimes referred to as "batch" or "offline" system. It may be appreciated that the time interval is determined by requirements that vary among systems. For example, a high-performance aircraft real-time control system may be required to respond in microseconds, while for a real-time reservoir level regulator update intervals of hours may be acceptable. In interactions with a human user, a system providing "real-time response" means a user receives a response to an input quickly enough to allow interactive or "live" use of the system without annoying delay.

In the descriptions herein, real-time transaction processing means that the system is designed to rapidly complete an operation that affects system data and the resulting changed data is made available to other system components as rapidly as possible, without requiring an offline synchronization process. It may be appreciated that the exact timing of such a system is dependent on a number of factors such as processing time and propagation of data across networks, but that the salient characteristic is rapid availability of data modified as a result of a transaction event.

Figure 12A:
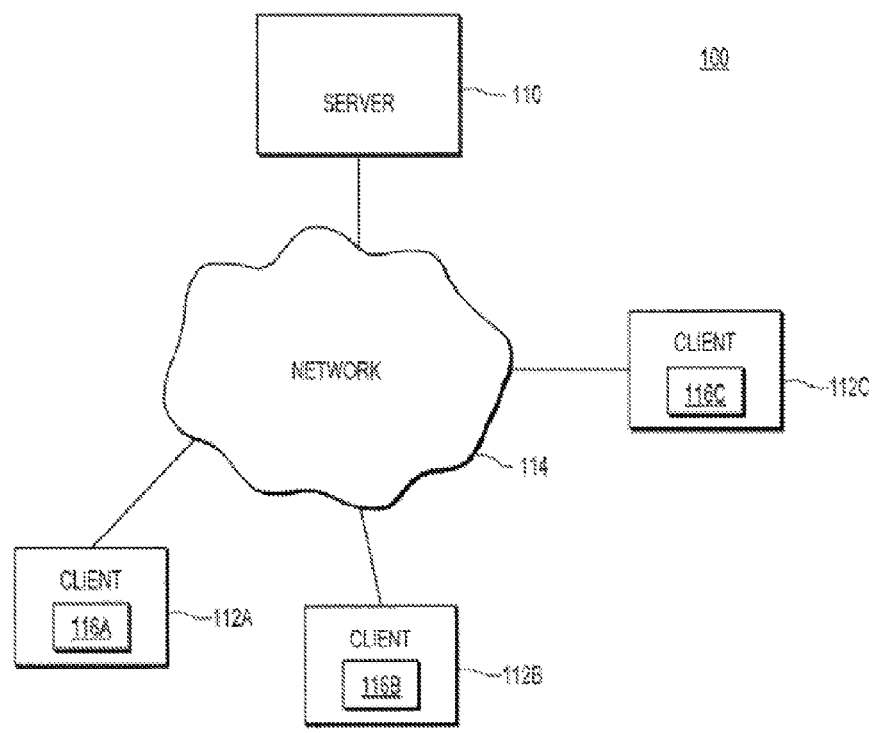
FIG. 12A is a schematic diagrammatic view of a network system in which embodiments of the present invention may be utilized.

FIG. 12A is a high-level block diagram of a computing environment 1200 according to one embodiment. FIG. 12A illustrates server 1210 and three clients 1212 connected by network 1214. Only three clients 1212 are shown in FIG. 12A in order to simplify and clarify the description. Embodiments of the computing environment 100 may have thousands or millions of clients 1212 connected to network 1214, for example the Internet. Users (not shown) may operate software 1216 on one of clients 1212 to both send and receive messages through network 1214 via server 1210 and its associated communications equipment and software (not shown).

Figure 12B:
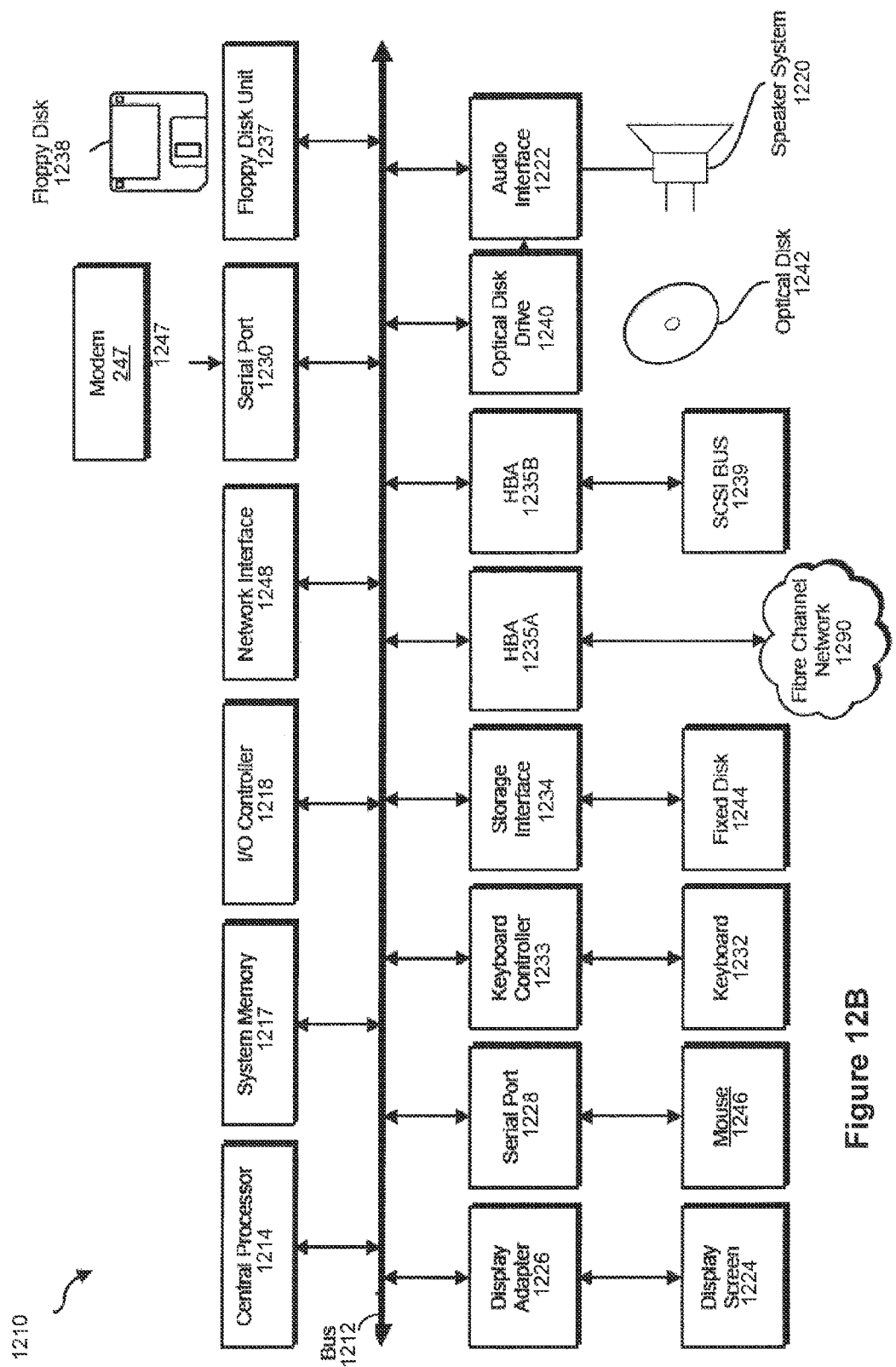
FIG. 12B is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 12B depicts a block diagram of computer system 1211 suitable for implementing server 1210 or client 1212. Computer system 1211 includes bus 1213 which interconnects major subsystems of computer system 1211, such as central processor 1215, system memory 1217 (typically RAM, but which may also include ROM, flash RAM, or the like), input/output controller 1218, external audio device, such as speaker system 1220 via audio output interface 1222, external device, such as display screen 1224 via display adapter 1226, serial ports 1228 and 1230, keyboard 1232 (interfaced with keyboard controller 1233), storage interface 1234, disk drive 1237 operative to receive floppy disk 1238, host bus adapter (HBA) interface card 1235A operative to connect with Fibre Channel network 1290, host bus adapter (HBA) interface card 1235B operative to connect to SCSI bus 1239, and optical disk drive 1240 operative to receive optical disk 1242. Also included are mouse 1246 (or other point-and-click device, coupled to bus 1219 via serial port 1228), modem 1247 (coupled to bus 1212 via serial port 1230), and network interface 1248 (coupled directly to bus 1213).

Bus 1213 allows data communication between central processor 1214 and system memory 1217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 1211 are generally stored on and accessed via computer readable media, such as hard disk drives (e.g., fixed disk 1244), optical drives (e.g., optical drive 1240), floppy disk unit 1237, or other storage medium. Additionally, applications may be in the form of electronic signals modulated in accordance with the application and data communication technology when accessed via network modem 1247 or interface 1248 or other telecommunications equipment (not shown).

Storage interface 1234, as with other storage interfaces of computer system 1210, may connect to standard computer readable media for storage and/or retrieval of information, such as fixed disk drive 1244. Fixed disk drive 1244 may be part of computer system 1211 or may be separate and accessed through other interface systems. Modem 1247 may provide direct connection to remote servers via telephone link or the Internet via an internet service provider (ISP) (not shown). Network interface 1248 may provide direct connection to remote servers via direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12B need not be present to practice the present disclosure. Devices and subsystems may be interconnected in different ways from that shown in FIG. 12B. Operation of a computer system such as that shown in FIG. 12B is readily known in the art and is not discussed in detail in this application. Software source and/or object codes to implement the present disclosure may be stored in computer-readable storage media such as one or more of system memory 1217, fixed disk 1244, optical disk 1242, or floppy disk 1238. The operating system provided on computer system 1211 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Many of the features and descriptions herein refer to an information model referred to as the "Unit Model." The design and structure of the Unit Model is itself part of the present disclosure and its features are the basis for many of the other features and descriptions of the multiple embodiments of the invention disclosed herein.

The descriptions herein can be roughly divided into three aspects. First, the unit model is an abstract set of elements, methods, and relationships. Second, an instantiation or instance of the unit model refers to a particular collection and assembly of model elements collected to correspond to a domain, set of observations, actual knowledge, data or the like. It can be said that a model instance is a model of the domain. Third, an implementation of the unit model refers to the machine implementation of the model or of an instance of the model, for example as a program and data in a digital computer. It should be appreciated that references using these three aspects may be used interchangeably. For example, a reference to the model can also refer to the implementation of the model and its methods on a computer. As another example, a reference to an instance of the model may be taken as a reference to a representation of the instance within the memory of a computer.

The Unit Model (also referred to herein as "the model" or "the information unit model" or "the knowledge unit model") is a model consisting of abstractions of structures and processes corresponding to intelligent information processing. The model is based on a singular atomic element, referred to as the "Information Unit" or the "Knowledge Unit." All areas of information may be described by arrays of information units and the relations between them. Several embodiments of the invention include different configurations of such knowledge units.

An Information Unit is a representation. It may represent anything. It may represent a real object, such as a car or it may represent an abstract thought such as an idea. An Information Unit may also represent a sequence of Information Units.

Figure 2A:
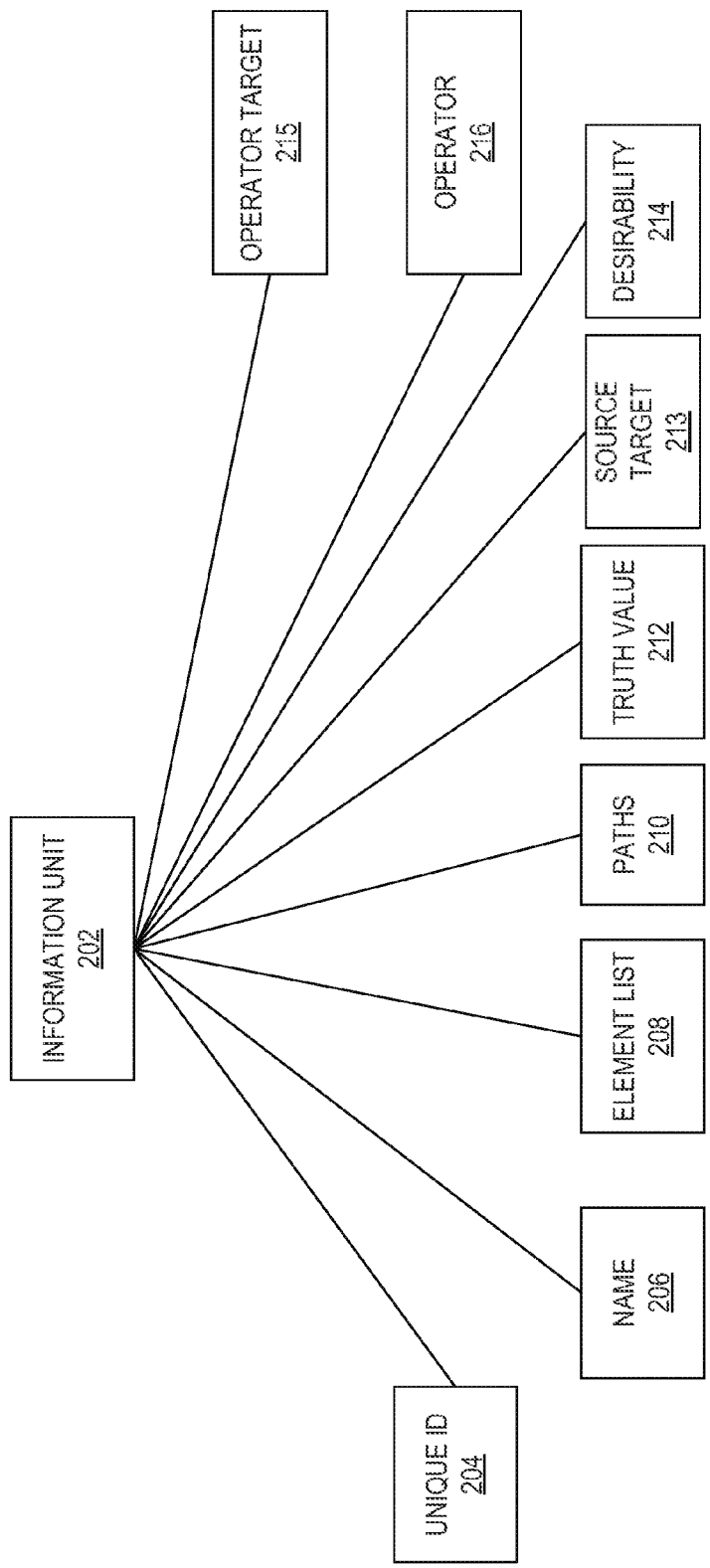
FIGS. 2A-2C are tree diagrams depicting an arrangement and relationship components of classes, elements, and paths respectively according to an embodiment of the present invention.
Figure 2B:
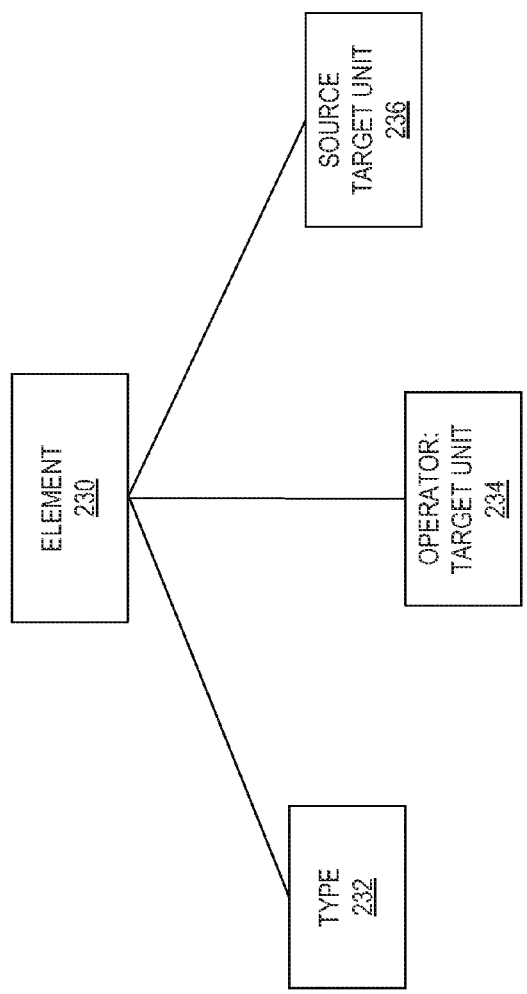
Figure 2C:
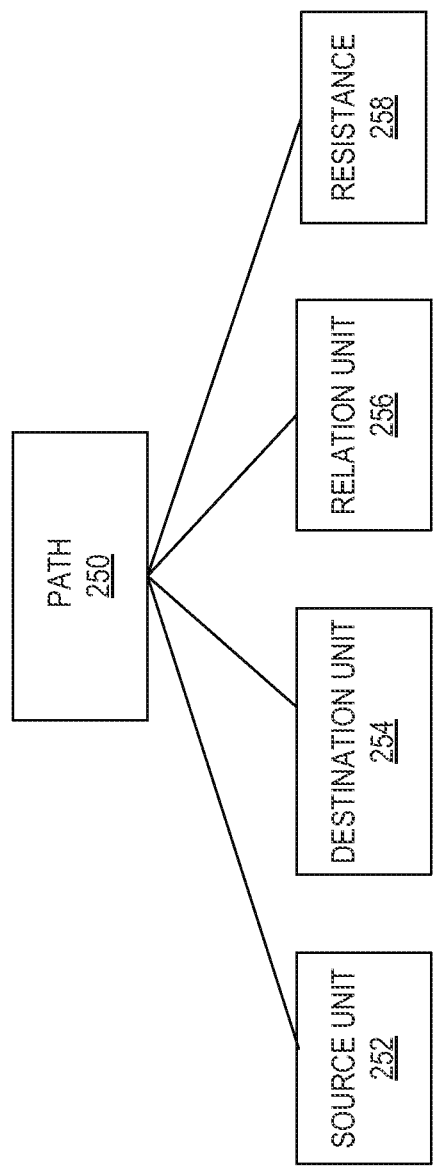

FIGS. 2A-2C are tree diagrams depicting the structure of an information unit and its constituent elements. Referring to FIG. 2A, Information Unit 202 is shown. Unit 202 has several associated Attributes, including Unique ID 204, Name 206, Element List 208 and a list of Paths 210.

Every unit typically has a unique identifier, although it is possible to have identical identifiers but that may imply either a second key or a potential for errant calling of a unit.

Every Unit may have a name or several names which are text strings used to help identify the meaning of the unit. For example, a unit may represent a blue car with an ID of 123xyz, but its name may be 'Blue Car'. The Unit may represent a mathematical variable representing the price of a bond. The ID might be 567 nmo. This Unit may have two names, the first being 'Bond Price' and the second name begin 'BP' which would be better suited for display in an equation. A Unit's name is not necessarily unique and is only used to help a human user to identify what the Unit represents.

Element List 208 represents a sequence of Elements. FIG. 2B depicts the structure of an Element. Element 230 is a structure which identifies another Information Unit. There are several ways in which an element Information Unit may be identified. It may be 1) directly referenced by its id 232, 2) indirectly referenced as the operator target 234 of an Information Unit, 3) indirectly referenced as the source target 236 of an Information Unit. Further the Information Unit referenced by an element may be the element referenced by an Information Unit. An element may be identified as a symbolic element or symbolic sequence for use in a mapping operation. Further, an element may reference a Unit by any of the above methods appended with a path that may, for example, point to an attribute of a class.

Paths list 210 is a list of paths that the Unit has with other information units. A Path structure is depicted in FIG. 2C. Path 250 consists of Source Unit 252, Relation Unit 256, Destination Unit 254 and Resistance 258.

Truth Value 212 is a value, e.g. binary or real, indicating either the condition or degree to which a unit represents reality or the success of a unit's operator.

Desirability Factor 214 is real value indicating the degree to which the unit represents something desirable or undesirable to the embodiment of the unit model instantiation.

Operator 216 indicates an action that will be undertaken upon receipt of a shock of sufficient magnitude. The action taken by an operator may create, modify or delete an information unit, it may create, modify or delete a path and it may call a real operator that is specific the models embodiment, e.g. manipulating an input or output device. An operator may more generally be any action that may act upon a sequence of Units, i.e. reordering units, a mapping, checking for the existence of a specific unit or set of units within another sequence of units.

Many Operators may be created in embodiments of the present invention. The listed operators are provided as examples of possible operators on units, atomic values, and other objects in the several embodiments of the invention. Such operators include, but are not limited to:

1. Createunit—Creates a new unit. The new unit is the target of the unit.
2. Copy—Copy a unit, or set of units and their relations (e.g. a class)
3. Copyonto—Copy the relations of a source unit and apply them to a destination unit
4. Deleteunit—Delete a unit
5. Shock—Send a shock to a unit
6. Fact—An operator which does nothing. The elements only serve to represent a sequence and is therefore referred to as a fact
7. Intersect?—Does one list have an elements in common with another list
8. Intersect-ex?—Are all of the elements of one list elements of another list
9. Loop (list, element)—Cycles of over each element of the list and sets the first element of [element] to the current element. The next time the loop receives a shock, it will set [element] to the next element in the list's elements list.
10. Reset (loop)—Resets a loop unit so that the next time it is shocked, it will set its element variable to the first element of the list.
11. Mapelements—Applies a map to the elements of a target unit and, if successful, sets the virtual units to one or more of the targets elements. If it is successful it sets its Truth Value to True, otherwise False.
12. Mappaths—Applies a map to the paths of a target unit and, if successful, sets the virtual units to one or more of the targets paths elements. If it is successful, it sets its Truth Value to True, otherwise False.
13. Addpath: [Unit] [Source] [Relation] [Destination]— Add a path to a unit
14. Deletepath—Delete a path from a unit
15. Clear—Removes all the elements from a list of units and clears virtual units.
16. Same Unit?: [Unit1] [Unit2]—Are Unit1 and Unit2 the same
17. Similar Unit?: [Unit1] [Unit2]—Do Unit1 and Unit2 have similar units
18. Set [Unit1] [Unit2] [Unit3]*[Unit4]—Set the elements of [Unit1] to [Unit2] [Unit3] and the elements of [Unit4]
19. Real: [Operator] [Parameter 1 . . . n]—An operator that will call the real operator specified by [Operator]. A real operator is one which interacts with anything outside of the unit model, e.ge. a display, a storage device, or an input device.

In addition to the operators on units, atomic elements that represent real numbers, input functions, processes, and other environmental aspects, may be operated upon by one or more of the following Real Operators:

1. $a=b+c$, $a=b-c$, $a=b*c$, $a=b/c$—Simple arithmetic operators
2. Cos, Sin, Tan, ArcCos, ArcSin, ArcTan, Cos h, Sin h, Tan h—Trigonometric Operations
3. Ln, Log, Power—Logorithms
4. IsNumber?—Do the elements of a unit represent a number
5. >, <, <=, >=, !=, =?—Simple arithmetic comparison operators
6. Div—Quotient and remainder operator
7. InputText—Get text from a user
8. Message—Set the text of a message to be shown to the display
9. MessageYesNo—Show a message box requiring the user to click on either a Yes or a No button
10. GetSelected—Ask the user to select units from the applications user interface
11. ApplicationMenu—Add items to the applications main menu which can access specific processes
12. UnitMenu—Intelligently adds items to the right click menus of a unit which can access specific processes.
13. GetComment—Gets the comment of a unit
14. ShowUnit—Shows a unit to a display
15. Form—Shows an interactive form with controls representing a set of units. This set is usually a class, class instance or list.
16. Import—Import a delimited text file
17. CountElements—Count the number of elements of a unit
18. FindParentProcess—Finds the process of which a step is a member
19. SetWorkingKB—Sets the a system's WorkingKB variable. The WorkingKB is used for multiple purposes, among which are setting the domain of new units which are created.
20. SetUnitKB—Set the domain of a specific unit.
21. SetTruthValue—Set the Truth Value of a unit
22. Sleep—An operator which causes shock flow to pause for a specified number of milliseconds
23. IsEmpty?—Does the unit have any elements? If it does have elements then the operator will set its unit TruthValue to False
24. LoadKB—Loads a Knowledge Domain from a storage device.

A Unit may have an Operator Target Unit 215 which is the subject of the Unit's operation. A Unit 202 may also have a Source Target Unit 213 which identifies the Unit that activates Unit 202.

The Unit Model is easy to work with, having a small set of constituent elements. An exemplary representation of the Unit Model is provided in FIGS. 2A-2C. The model is also very general. It consists of a single general structure (the information unit) and is sufficient to model any set of events which a source produces. The model is also general in its ability to accurately represent an immense variety of experience encountered. An unlimited number of event combinations may be expressed in terms of the model.

The Unit Model may be employed as an observer of a source wherein the source creates a series of "Events." Each of the observed Events is consequently instantiated as an Information Unit in the model. An Event is typically represented by the two-letter sequence "Ev" in the model nomenclature. An Event is an Information Unit in the model.

When multiple Events have been observed and multiple corresponding Information Units have been instantiated in the model, "Relations" between Units may also be instantiated. Examples of these Relations may address timing between Events where a Relation may be "before," "after," or "simultaneous." Another example of a Relation between Units is "different from," expressing that the Events are not identical. A Relation is typically represented by a lower-case letter "r" in the model nomenclature. An Information Unit may also be used to represent a Relation between Units in the model.

Two Units taken in conjunction with the Relation between them is defined as a "Path." A Path may also be represented by an Information Unit in the model.

A "State" is a collection of instantiated Events. Thus each observed Event creates a new State in the model. A State is typically represented by a lower-case letter "s" in model nomenclature. A State is also an Information Unit in the model.

A "Situation" is defined as a set of sequential States. In particular, a Situation is a sequence of States of related Information Units. A Situation is typically represented by an upper-case letter "S" in the model nomenclature. A Situation is also an Information Unit in the model.

When a particular state is always followed by another particular state, the two States are said to have a "Conditional Relationship." A Conditional Relationship is typically represented by the two-character sequence "→" in the model nomenclature. A Conditional Relationship is also an Information Unit in the model.

A "Symbolic Unit" is a Unit that may take on the value of any other Unit. A Symbolic Unit is useful for generalizations where more than one Event matches a case. A Symbolic Unit is typically represented by the character sequence comprising an underscore ("_") followed by an integer in the model nomenclature and is used in operations involving a mapping. A Symbolic Unit may be constrained to represent a single Unit or may represent a sequence of Units.

It may be noted that each Conditional Relationship has Units upon which it depends (antecedent conditions) and other Units that are a consequence of the antecedent conditions being satisfied. Thus, consequential Units represent not just a Sequence of Units, but they also indicate how the next State will differ from the one before it. Thus the consequence is also an agent of change.

In some embodiments, the consequence comprises creation of a new Unit. In other embodiments the consequence instead modifies an existing Unit. Thus the satisfaction of a conditional relationship may create, modify or remove an information Unit (a target Unit) as defined by its operator.

Each Information Unit may have a relationship to one or more other information Units, which may include a sequence, potentially stored as a path. The relationship between an Information Unit and another Information Unit or a target sequence may be an equivalence, a mapping or an abstraction.

In the case of an Information Unit including multiple Units, an element sequence may, in various embodiments, be ordered according to various criteria or the sequence may have no particular ordering. For example, a sequence may be ordered or sorted according to time of creation or similar temporal criteria. It is thus possible to represent all experiences as a set of Information Units.

A "Library" is a collection of Domains.

"Common Flow" is free and unrestrained flow. "Bipolar Flow" is flow from two displaced Information Units.

Encapsulation is the process by which multiple Units are referenced as a single Unit. Examples of Encapsulations are: Lists, Processes, and Domains.

A persistent Event or set of persistent related Events is referred to as an "Object." Objects may be Lists, Class instances, and may correspond to real physical things. A "List" is defined as an Object composed of a sequence of elements.

A "Process" is an Encapsulation of a set of Units which have conditional relations to each other, usually in a linear fashion. A Process directs one or more shocks to a sequence of Units.

A "Domain" is an area of knowledge. A synonym for Domain is "Universe." A Domain can comprise Objects, Classes, Information Units, and other Unit Model elements.

We refer to a set of Objects that all have a similar set of relations as a "Class." A Class is a virtual set of Units that represent a set of Information Units wherein all of the represented Information Units have similar characteristics. There is no limit to the number of Information Units in a Class. Similar in this context means that the set of Relations or characteristics are the same at some level of abstraction.

We refer to members of a Class as "instances" of the Class. We refer to the similar Relations as Attribute relations, and to Events that form Relations as "Attributes" of the Class.

All Classes may have a set of processes that encapsulate all Conditional Relationships that may exist between the Classes attributes. These Processes are referred to as a "Principles" of the Class. In general, a Class may have any number of Attributes and Principles.

An Attribute may be a text string, a text string constrained by a list of options, a Class itself or a list. For example, a name attribute is of type text string. Sex (Attribute) of a Person (Class) is an example of a text string attribute constrained by a list of either 'male' or 'female'. Employees (List Attribute) would be an example of a list attribute where each list item is a class Employee and Employees is an Attribute of Company.

We have described Objects, Classes, Lists and Processes. However, Information Units may be arranged in configurations of much greater variety. Information Units may be created that are random sequences of other Information Units. It is possible that some of the created Units will express a Conditional Relationship that may be deemed a predictor of a future State because of correlation with observed States. However, as past performance is not necessarily indicative of future results, Units that express a Conditional Relationship may or may not relate to a positive or desirable Truth Value.

Thus each Unit has a binary-valued property which indicates its relation to observation and we refer to this property as its "Truth Value" or "TV." The Truth Value may be "true" or "false," or in alternative embodiments a real-valued quantity. The Truth Value may in some instances also represent the success or value of a Unit's Operator. The Truth Value of a Unit may be modified by the action of the same or different Unit's Operator. In other embodiments, the Truth Value may be a non-binary real value, representing a fuzzy logic evaluation of this property of the Unit. Such fuzzy values may be real numbers, for example ranging from 0 to 1, integer values ranging between predetermined minimums and maximums, or other sets of possible values.

Each Unit also has a Desirability Factor which may be an integer or a real-valued property corresponding to the desirability of the Unit relative to other Units.

As described, an Information Unit may be constructed and added to the Universe as a consequence of observation. An additional property of the Information Unit is called an "Operator." The Operator gives a Unit the ability to create and modify its own set of Information Units, including applying shock as described below, performing logical or set operations on Information Units, and ordering, sequencing, and other processing functions on such Information Units. Thus it may add to, remove, copy and edit its own set of Information Units, including adding, removing, copying, or altering individual portions of the Information Unit. The Operators mirror the observed agents of change.

Three additional modification Operators apply to the Information Unit: Shock Operator, Setting Path Resistance, Setting Thresholds. The Shock Operator applies a "Shock" to a Unit and thus enables selective initiation of Flow. The Path Resistance Operator sets the "Resistance" property of a Path. In one embodiment, Resistance is a positive, real-valued quantity. In one embodiment, the Resistance property is analogous to fluid, mechanical or electrical resistance in that resistance resists energy flow and dissipates energy. Thus the Resistance property enables selective control of Flow by opening and closing paths over which Energy flows. In one embodiment, the Resistance property of a Path changes over time. For example, the Resistance of a Unit may decrease each time Energy flows through the Path. Thus a Path may include a memory of its history of Flow experienced. The past history of Flow through a Path may affect Resistance to present Flow. In other embodiments, Resistance may be defined as a constant property of a particular Unit.

Each Unit has a property known as its "Threshold" which quantifies the number and/or amount of Shocks required to activate the Operator of the Unit. In some embodiments, a single "Shock" activates a Unit and the Unit will consequently Shock a potentially unlimited number of "destination Units." In other embodiments, multiple Shocks are required to activate the Operator and to initiate Shocks along all of its conditional paths. In one embodiment, multiple Shocks must arrive within a set period of time. In another embodiment, multiple Shocks are accumulated until the cumulative amount of Shocks reaches or surpasses the Unit activation Threshold.

One exemplary embodiment of a system using the Unit Model is shown as system 100 in FIG. 1. Data bus 102 interconnects processor 108, input devices 102, output devices 104, communication interface 106, and memory 110. Memory 110 stores various items used by processor 108 to implement the methods described herein, and includes operating system 112, Unit model module 114, model visualization module 116, model editor module 118, model observer module 120, operation module 122, dynamics module 124, all having access to unit model storage 126.

In a network comprising many interconnected information units, the number of possible operators that may be activated is unlimited. If this were to occur, many new units would be added to the total set. Applying the concepts of finite energy and Resistance according to some of the various embodiments of the invention, will limit the number of possible activations.

Another important aspect of the Unit Model is termed Flow. We refer to this aspect of the model as dynamics. A "Flow" is defined as the trail of Units that have been activated and the paths which connect these Units. Units included in the Flow path are different from Units outside the Flow because each included Unit has had some dynamic property flow through it. We call this dynamic property "Energy." We, therefore, say that a Unit which is Shocked with sufficient Energy will activate its Operator. Any Unit may be the antecedent condition of a Conditional Relationship. The dynamic of applying Energy explains how the consequence is activated. A Conditional Relation acts as a path to transfer Energy from the condition to the consequence.

In various embodiments, a Unit operates subsequently to receiving a Shock by using the Energy from the Shock to perform the Unit Operator. If the Unit has a Path to one or more destination Units, the remaining Energy will be directed to the destination Unit or Units. This transfer of Energy continues as long as the destination Units have paths to destination Units of their own and have Energy remaining after overcoming Operator Consumption of Energy and Resistive losses across Paths. There are many possible Energy Flow pathways in any particular instantiation of a unit model. A particular domain or Universe may have different ways in which Energy is dissipated as Energy Flow encounters Resistance.

Figure 6:
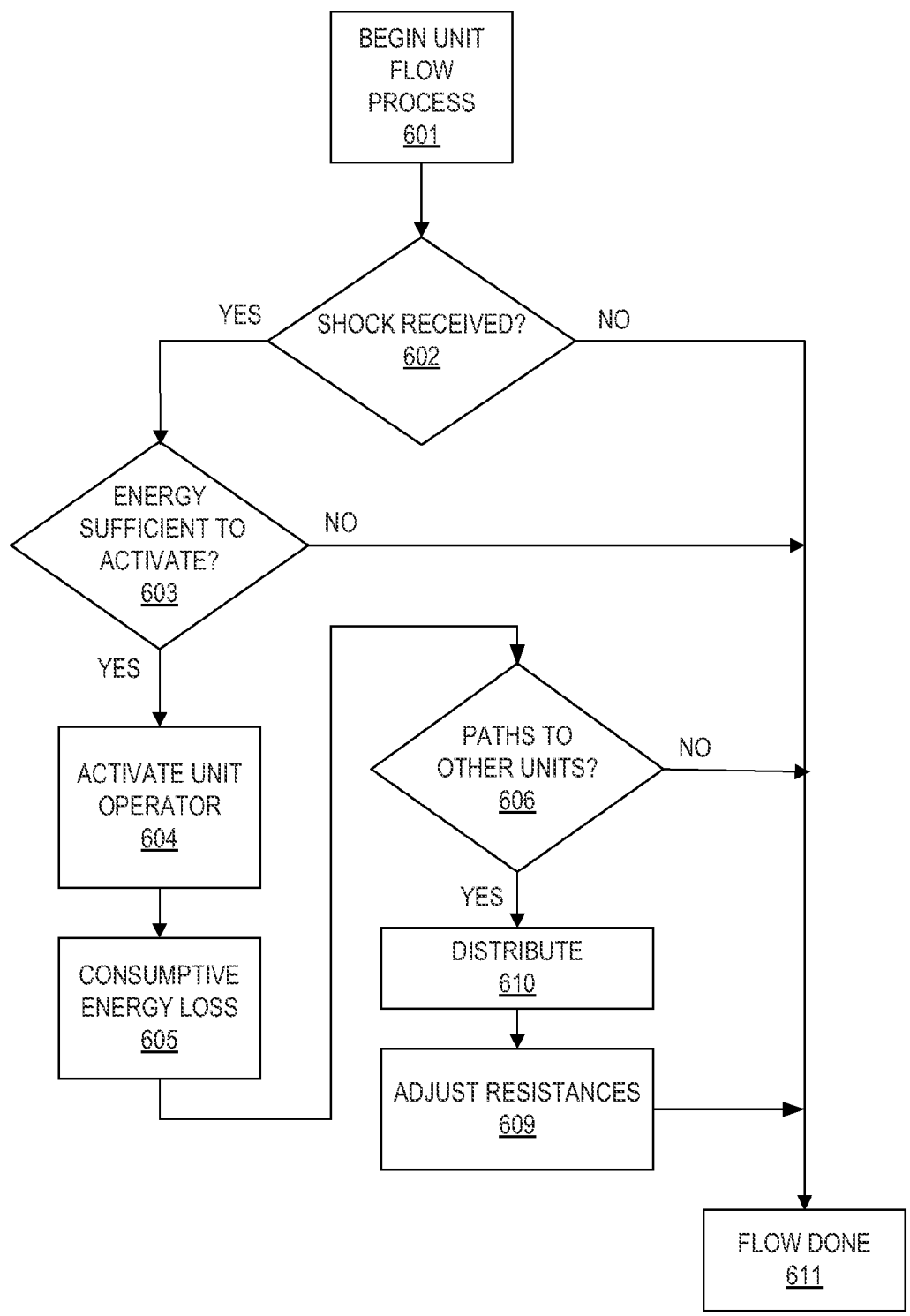
FIG. 6 is a flow chart describing processing of a Shock within a single Unit according to an embodiment of the present invention.

Referring to FIG. 6, a flow chart describes the processing of a Shock within a single Unit according to an embodiment of the present invention. FIG. 6 describes processing of Flow at a single Unit according to one embodiment of the invention, however a particular domain or Universe may process Flow differently. Since practical models comprise multiple connected Units, it is necessary to iterate through all Units in a similar process. Processing begins at 601 and proceeds at decision 602. Decision 602 determines if the Unit under consideration has received a Shock or any Energy from other Units. If 602 is false (NO), processing of the Unit terminates at 611. If 602 is true (YES), processing continues with decision 603.

In some embodiments, the amount of Shock Energy must exceed a threshold value to activate a Unit. Decision 603 determines if the Shock Energy is sufficient to activate the Unit. If decision 603 is false (NO), processing of the Unit terminates at 611. If 603 is true (YES), processing continues with 604.

At 604 the Unit operator is activated. Then at 605, any Consumptive energy loss is applied to determine remaining energy. In some embodiments activation of a Unit uses or dissipates energy from the input. In other embodiments, no energy is lost on account of Operator activation and all input energy remains for propagation to attached Units. In still other embodiments, energy is added when a Unit is activated.

At 606 resistance adjustments are applied. In some embodiments, activation of a Unit causes its Resistance to decrease or its Threshold to decrease, thus making the Unit more likely to be included in subsequent Flow. In other embodiments, activation of a Unit causes its Threshold or Resistance to increase, making the Unit less likely to be included in future Flow.

Once the processing at 604 and 605 has completed, the Unit may have Energy to pass on to connected other Units. At 606 it is determined if other Units are connected. If no Units are connected, processing terminates at 611. If at least one other Unit is connected, decision 606 is true (YES) and processing continues at 607.

At 607 any remaining Energy from the incoming flow is distributed among output connections. In one embodiment, the Energy is divided equally among the output connections. In another embodiment, a distribution algorithm determines how the Energy is divided if there are multiple output connections. The distribution algorithm may also restrict flow to Paths with Relations meeting a particular criteria. Processing terminates at 611.

The Unit Model has several devices which may be activated to cause change in the Information Units used in the model. In various embodiments, methods use these devices to pursue the desirable and avoid the undesirable. A particular domain or Universe may have its own measure of desirability based on a variety of conditions.

The previous sections [098] through [0103] described the activity after a unit receives a shock. In principle, an infinite number of units could receive shocks simultaneously. In theory this is perfectly acceptable. In practice, however, the available hardware will dictate how the system manages these shocks. There are numerous means by which this can be accomplished. On a serial system one embodiment of the system employs a set of shock stacks which are traversed by the engine in a methodical top to bottom way. A unit whose operator shocks another unit may internally add a shock to one of the stacks in this set of stacks. A stack is a structure which is a list of shocks. A shock is a structure with properties related to the Energy of the shock and a path property. Paths define the source of a shock, the destination and the relation which connects the two and through which energy will flow. Stacks, shocks and paths may be implemented either by the engine or the Unit Model. A shock is defined by the path through which the energy would flow.

Shocks may be added to the end of the current stack or a new stack may be created to which the shock is added and the new stack be set to the current stack. Therefore the flow to the target unit will complete before the previous stack will resume its processing. It should be noted that multiple flows may operate in parallel though in a serial time managed manner. The manner by which energy is distributed to connections with a unit is a process which may be implemented by a stack.

Consider a set of units that are connected by > and !>. Flow will travel down the > path if the Truth Value of the unit is TRUE and down the !> path if FALSE. The resistance for all paths out except for the > and !> relations is set to infinite. Flow may therefore be assured of going down one of those paths. By placing a number of units with similar paths and resistance settings together flow may be directed through a predetermined set of units. These units will have operators which perform functions such as mappings, conditional determinations, unit creation/deletion, unit modification, real interface manipulations and dynamic path resistance setting. This set of units is referred to as a process.

Figure 8:
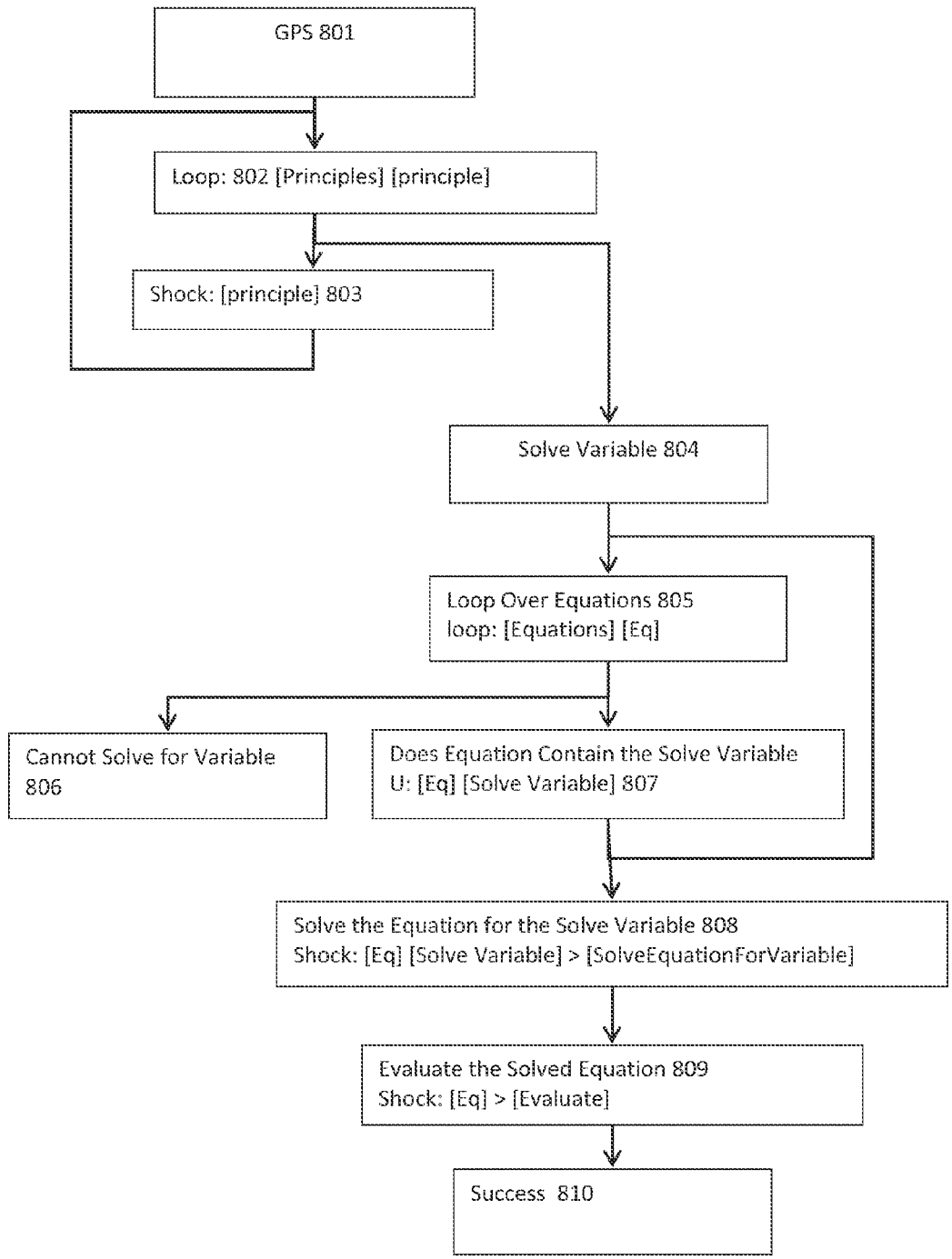
FIG. 8 shows a flow chart describing an embodiment of the steps of a problem solving method of the present invention.

The General Problem Solver of FIG. 8 is an example process embodying an algorithm used for determining unknown quantities whose values are determined by equations. GPS 801 applies the fundamental principles of a domain in 802 & 803 in order to calculate unknown quantities from known quantities and employs all of the necessary math. GPS 801 may be designed with no specific model as reference and can therefore apply to any domain described by the unit model. GPS 801 loops over all principles as described earlier and applies the principle by shocking its process. When there are no more principles to apply the loop operation will have a Truth Value of FALSE and follow the path to the 'Solve Variable' unit in starting with box 805 which loops through the list of equations wherein each equation is a unit, the elements of which represent numbers, variables and other arithmetic symbols in a specific sequence. An equation may be created by shocking a unit whose operater is a create operator. The equation elements may be set at that time or later. An equation list is a unit whose elements are a list of equations. The equation is checked to see if it includes the solve variable by performing an Intersection operation to see if the Solve Variable is a member of the equations (Eq) elements in step 807. If the Solve Variable is a member of the equations elements then flow will travel to the next unit which will shock the process which solves an equation for a variable in step 808. Next the equation will be evaluated in step 809 and output successfully in step 8010. If the Solve Variable is not present, the process ends in failure in step 806.

Goal-oriented Flow is Flow that achieves a desired result or satisfies goal criteria. In one embodiment, the goal criteria are expressed as a set of starting Units and a set of ending Units. In other embodiments, the starting and ending Units of a Goal may be expressed as Situations or States. Various methods may be used to find pathways and Units that connect the ending Units to the starting Units within a particular instantiation of the model.

A significant feature of the Unit Model is Goal-oriented Flow, and the identification of Units and connections that comprise a Flow that satisfies the goal in an instantiation of the model. A related concept is "Directed Flow." Directed Flow comprises a goal, a Domain from which the Flow starts and the resultant Flow. Exemplary applications of Goal-oriented Flow include discovery, general problem solving, and testing of Hypotheses. A "Hypotheses" is the process of developing a new Class of knowledge Units from known knowledge Units.

In various embodiments, instantiations of the Unit Model may exhibit feedback, regulation and observation. As an example, consider two Situations, denoted as S1 and S2. Certain Information Units are members of both S1 and S2. S2 includes some of the Units in S1. Some S1 Units are targets of Operators of one or more Units in S2. Thus S2 may monitor S1 and modify the content of S1 in response to predefined criteria. This capability provides the basis for self-observation and self-regulation through feedback. This concept may be extended to more complex regulatory scenarios involving more than two Situations, such as S1→S2→S3→S1.

The preceding discussion describes use of the model to predict, explain and pursue desirable things based on general principles of deduction, with the assumption that correlation generally indicates a likely causal link. However, the Unit Model has additional useful benefits. The model may be used to discover knowledge, reflect on experience and make generalizations.

The model may also maximize efficiency in finding new knowledge amongst the information of its experience or in reaching a Goal. Maximization of efficiency may be stated in terms of Dynamics. As described, each Flow depends upon Energy. The possible Flow paths may exceed the Energy available to produce Flow. Thus it is desirable to reduce the Energy required to achieve a Goal.

There are many ways to create or extend an instance of a Unit Model. As discussed, observation may be used to add to a Unit Model instance. In some embodiments, it is desirable to create or extend an instance of a Unit Model from information in another form rather than from observation. In one embodiment, such a conversion is accomplished by application of the General Modeling Process (GMP) in the Dynamics of the system. GMP is a set of methods for dynamically converting knowledge from common form to Unit Model form. The GMP is a generalized way to develop specific Domains.

Figure 7:
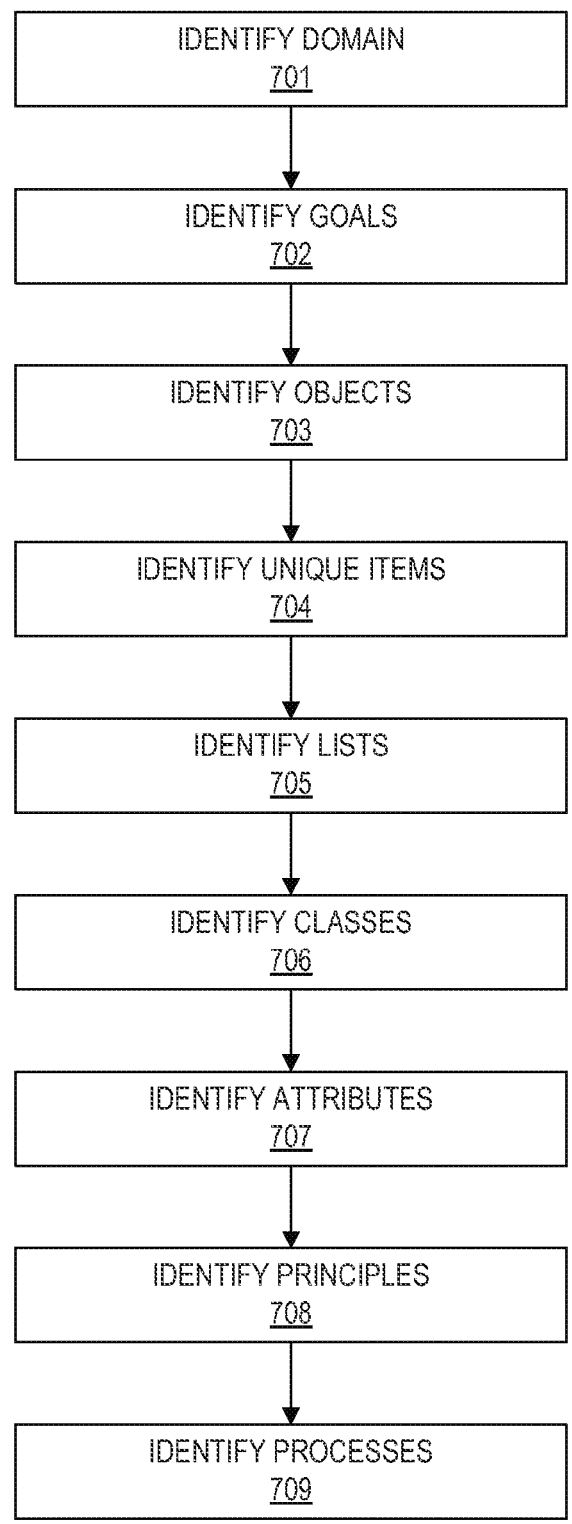
FIG. 7 shows a flow chart describing an embodiment of the steps of a process for conversion to a Unit Model representation.

Refer to FIG. 7, which shows a flow chart describing an embodiment of the steps of a GMP conversion. The steps shown in FIG. 7 are general and may be adapted to the needs of the specific embodiment, domain, or data conversion needed. The steps may be performed in a different order or some steps may be omitted as needed.

In FIG. 7, at step 701 the Domain is identified, collecting relevant data from the real or physical world and determining the scope of the Model instance being created. At step 702, the goals for the Domain identified at step 701 are identified. Goals may be identified in terms of desirable Information Units or in terms of one or more processes. At step 703 the Objects needed are identified, including identification of the types of Classes and Attributes appropriate for the Domain identified at step 701. At 704 unique items in the Domain that have not been identified at step 703 are identified and captured.

At step 705 Lists and Encapsulations are identified, including constraints. At step 706 similar objects are grouped to identify specific classes in association with the Class types identified at step 703. Similarly, at step 707 Specific Attributes needed for definition of each Class are identified.

At step 708 Principles and Conditional Relationships are identified in accordance with the Domain Classes identified and defined. At step 709 required processes are identified. Typically these processes are derived from the Goals, Objects, and Classes defined for the Domain, but also may be associated with Class Attributes.

There are many ways to implement the Unit Model in practice. In one embodiment the Unit Model is practiced manually, for example using paper and drawing apparatus. In any instance of the model that exceeds a few Units or Relations it is practical to use a digital computer to store and process the Units of the model in accordance with the features and descriptions herein. Thus in one embodiment the Unit Model is provided as a set of data structures, algorithms and programmed functions that enable a digital computer to store and execute the model. In another embodiment an analog computer is used. In another embodiment a hybrid computer incorporating both analog and digital components is used. In one embodiment hardware components specifically designed for the Unit Model are constructed to store or execute the model.

In one embodiment the computer implementation includes a visualization application. As described herein, the Unit Model may be used to display and organize data visually. The visualization application provides the capability to view the data on a computer display or printer. In one embodiment the computer implementation includes an editor. The Unit Model editor allows a user to retrieve, inspect, modify, add to, store and document elements of the model. The editor is similar to a visualization application but adds the capability to make changes to the model. Thus the editor may be used to create, modify, maintain or delete a portion or an entire knowledge Domain. An editor may be designed to edit the elements of the model using either textual descriptions or graphical displays.

In another embodiment the computer implementation includes an observer module. The observer module automatically processes events to form units in the unit model and stores the resulting model. Events may be obtained from any source, for example from a data file, a data network connection, a simulator, a real-time monitor, or from external instrumentation and measurement apparatus.

In one embodiment the computer implementation includes an operator module for acting on Information Units in the model. The operator module may perform operations including conditional association, identification of causal relationship, assignment of a value, editing, self-observation, Shock initiation, Shock Resistance, Threshold determination, and Generalization. The operator module may include mechanisms for discovering and generalizing relationships among the elements of the data.

In one embodiment the computer implementation includes a dynamic engine module for coordinating interaction of other modules, controlling the flow of the elements of the model. In one embodiment the computer implementation includes circuitry for storing and retrieving the model in persistent storage, for example on magnetic tape, rotating disks or optical storage. In one embodiment the implementation includes an interface to store the model in a database and retrieve the model from the database. Many database programs are available that provide benefits such as reliability, redundancy and ability to house large quantities of data. In one embodiment a plurality of the applications are integrated into an information modeler toolset or workbench. The integrated toolset includes a user interface to allow a user to control, manipulate, and selectively execute functions of the model.

There are many computer applications and tools that may be implemented according to the features and descriptions herein. The illustrative embodiments herein are by way of example only and should not be taken as exhaustive nor limiting. In one embodiment of the features and descriptions herein, the computer implementation of the Unit Model is provided as a set of computer functions, objects, subroutines, or modules where the features may be called by an external computer program. This allows a user to incorporate the Unit Model implementation into another computer program without coding all of the functions needed to implement the Unit Model access, manipulation and execution.

The features and descriptions herein are useful in modeling a wide variety of domains. Some exemplary embodiments and instantiations of application of the features and descriptions herein are illustrated in the Figures and associated descriptions. It should be appreciated that not all of the features of the Unit Model need be employed in the modeling of a particular domain. Instead, the Model provides a rich set of features and options that may be employed as needed. Similarly, some aspects of the model capability may be adapted to match a specific domain, without modification to the model itself.

For example, in the aspects of Resistance, Dynamics, and Flow, each Domain model may require different characteristics. In some embodiments, Energy of Flow is conserved such that the sum total of Energy output and Energy dissipated is exactly equal to the Energy injected into the system, In other embodiments, some units regenerate or amplify the Energy during propagation. The particular domain or Universe determines the rules applied to the Resistance, Dynamics and Flow.

Figure 3A:
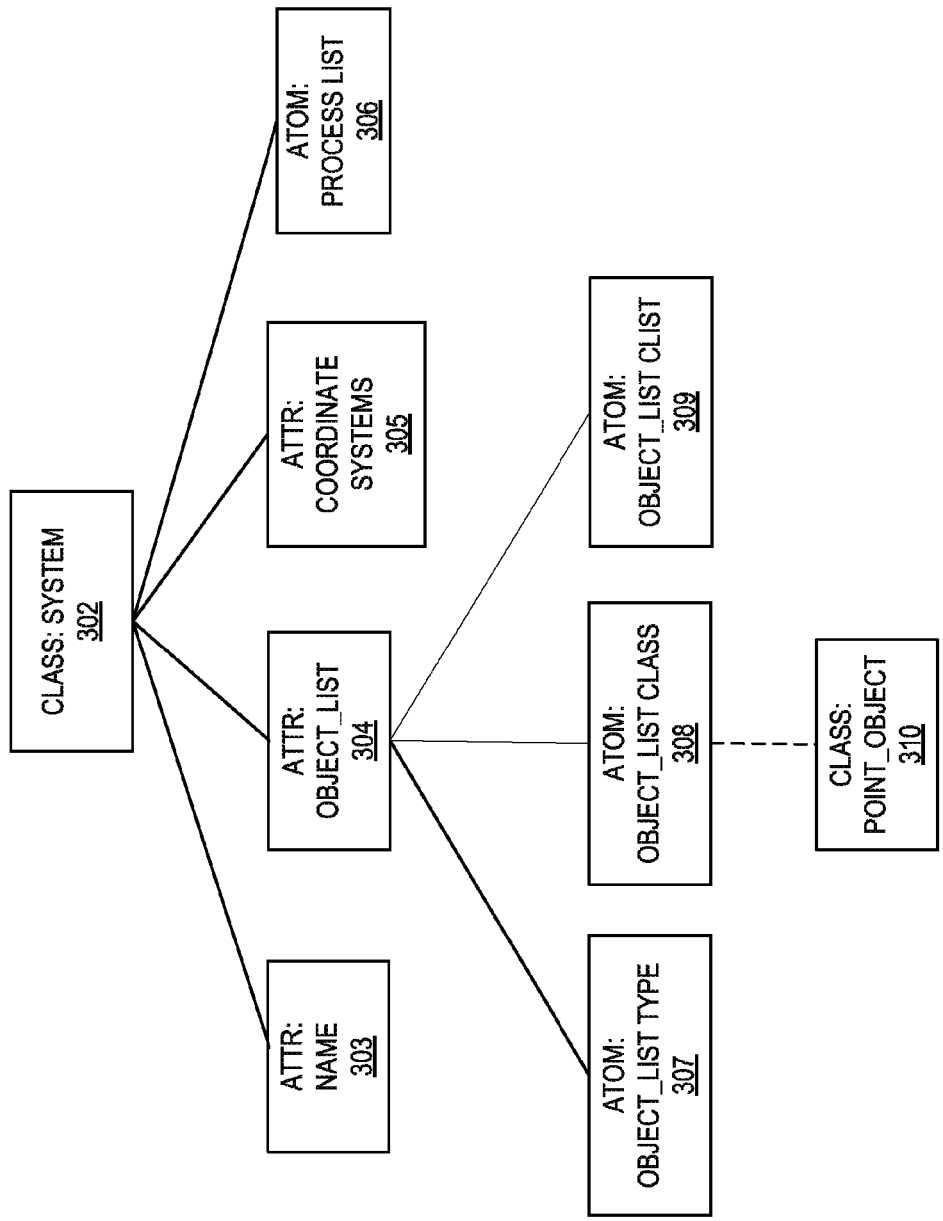
FIGS. 3A-3G illustrate an embodiment of the present invention applied to the domain of kinematics of point objects in a closed system.

Referring now to FIG. 3A, an embodiment of the present invention applied to the domain of kinematics of point objects in a closed system is depicted. This illustrates the Unit Model capability to capture the characteristics of a physical system. At 302 the top level system Class is shown. Class 302 has various Attributes. Not all Attributes are necessarily shown in the Figures. Exemplary Attributes of Class 302 are shown as name attribute 303, object_list attribute 304, and coordinate systems attribute 305. Class 302 also is associated with process list 306.

In some embodiments attributes that are Encapsulations are associated with a type Unit, a class Unit, and a constraint list ("CList") Unit. Accordingly, still referring to FIG. 3A, object_list attribute 304 is associated with object_list type atom 307, object_list class atom 308, and object_list CList atom 309. Class atom 308 may be associated with one or more class instances. Point object class 310 is one such instance associated with class 308.

Figure 3B:
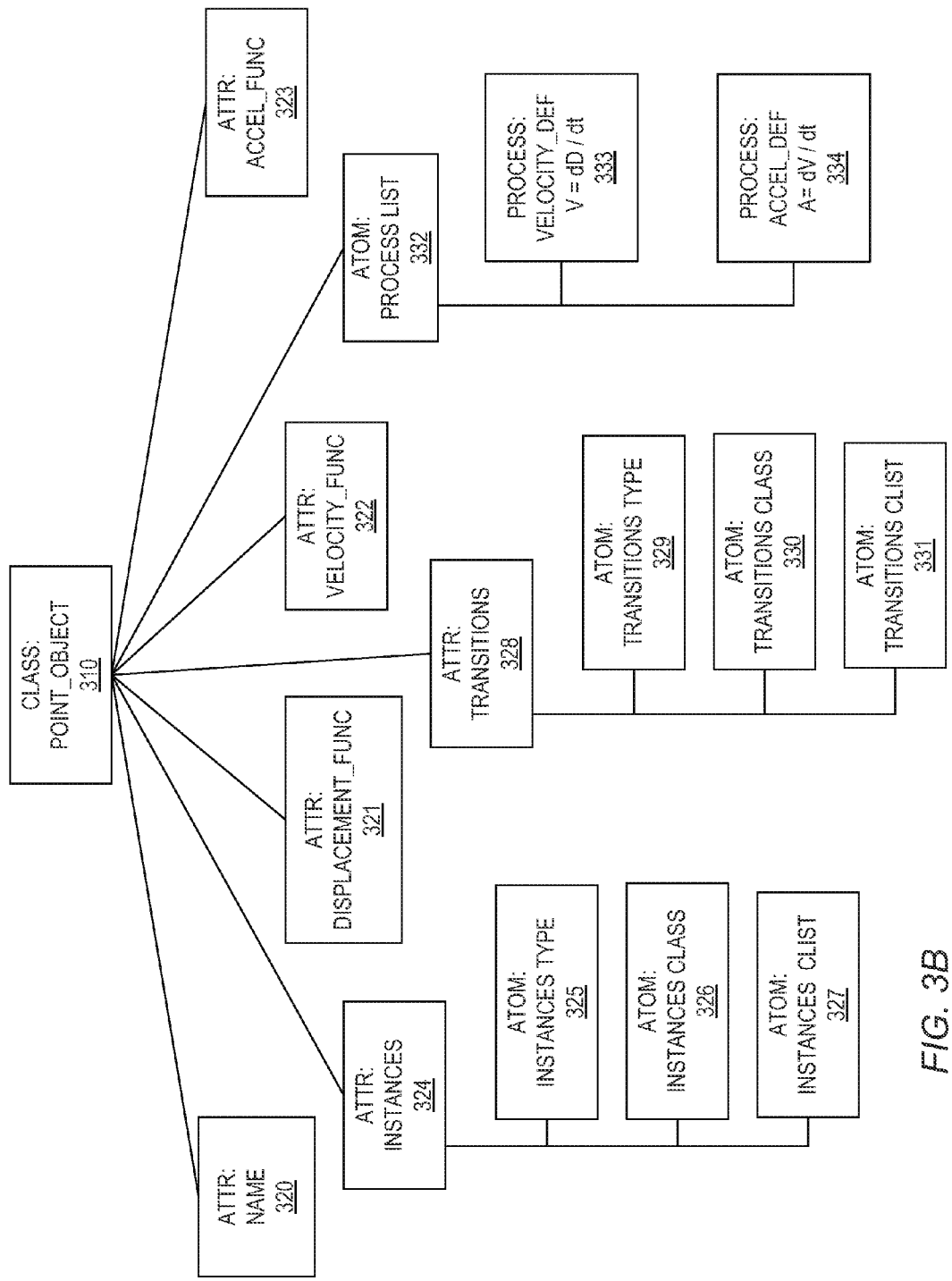

Referring now to FIG. 3B, the example from FIG. 3A continues. Point object class 310 from FIG. 3A is shown with exemplary associated attributes. Attributes include name 320, displacement function 321, velocity function 322, acceleration function 323, instances 324, and transitions 328, point object class 310 is also associated with process list 332. Each of these attributes and processes add a property or function to the point object model defined by point object class 310.

Instances Attribute 324 is an Encapsulation of instances of point objects within the model in this exemplary embodiment. Instances Attribute 324 is associated with instances type 325, instances class 326, and instances CList 327. Similarly, transitions Attribute 328 is associated with transitions type 329, transitions Class 330, and transitions CList 331.

Point object Class 310 is associated with various processes through process List 332. Two exemplary processes are shown. Process 333 defines a process for calculation of velocity as the time derivative of displacement, and process 334 defines a process for calculation of acceleration as the time derivative of velocity.

Figure 3C:
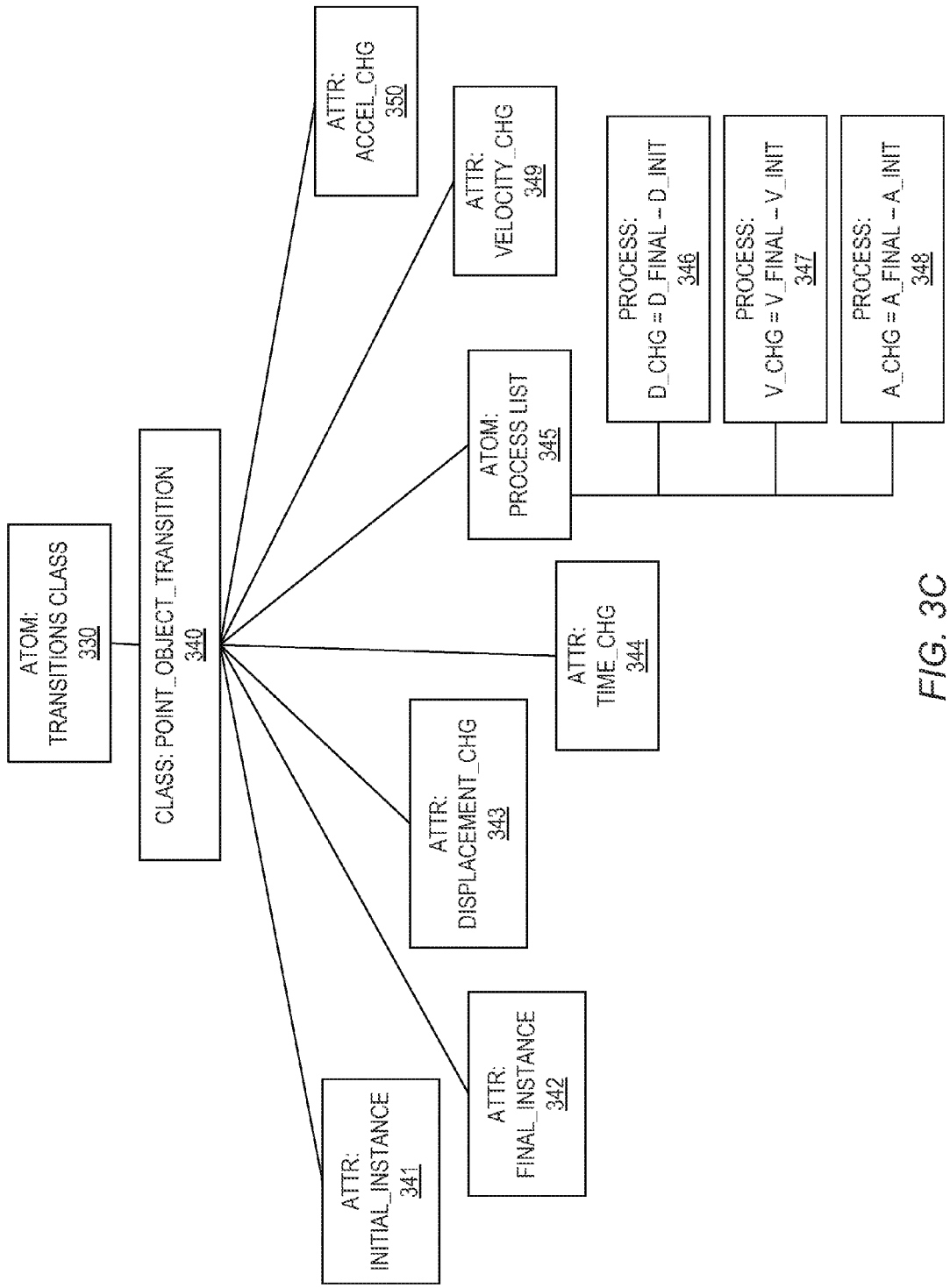

The exemplary embodiment of point object kinematics continues in FIG. 3C. The transitions class 330 (from FIG.

3B) is shown with an instantiated point object transition class 340. Several associated attributes of class 340 are shown. Attributes include initial instance 341, final instance 342, displacement change 343, time change 344, velocity change 349, and acceleration change 350. Class 340 is associated with process List 345. Process List 345 is associated with three processes. Process 346 defines a process for calculation of displacement change. Process 347 defines calculation of velocity change. Process 348 defines calculation of acceleration change.

Figure 3D:
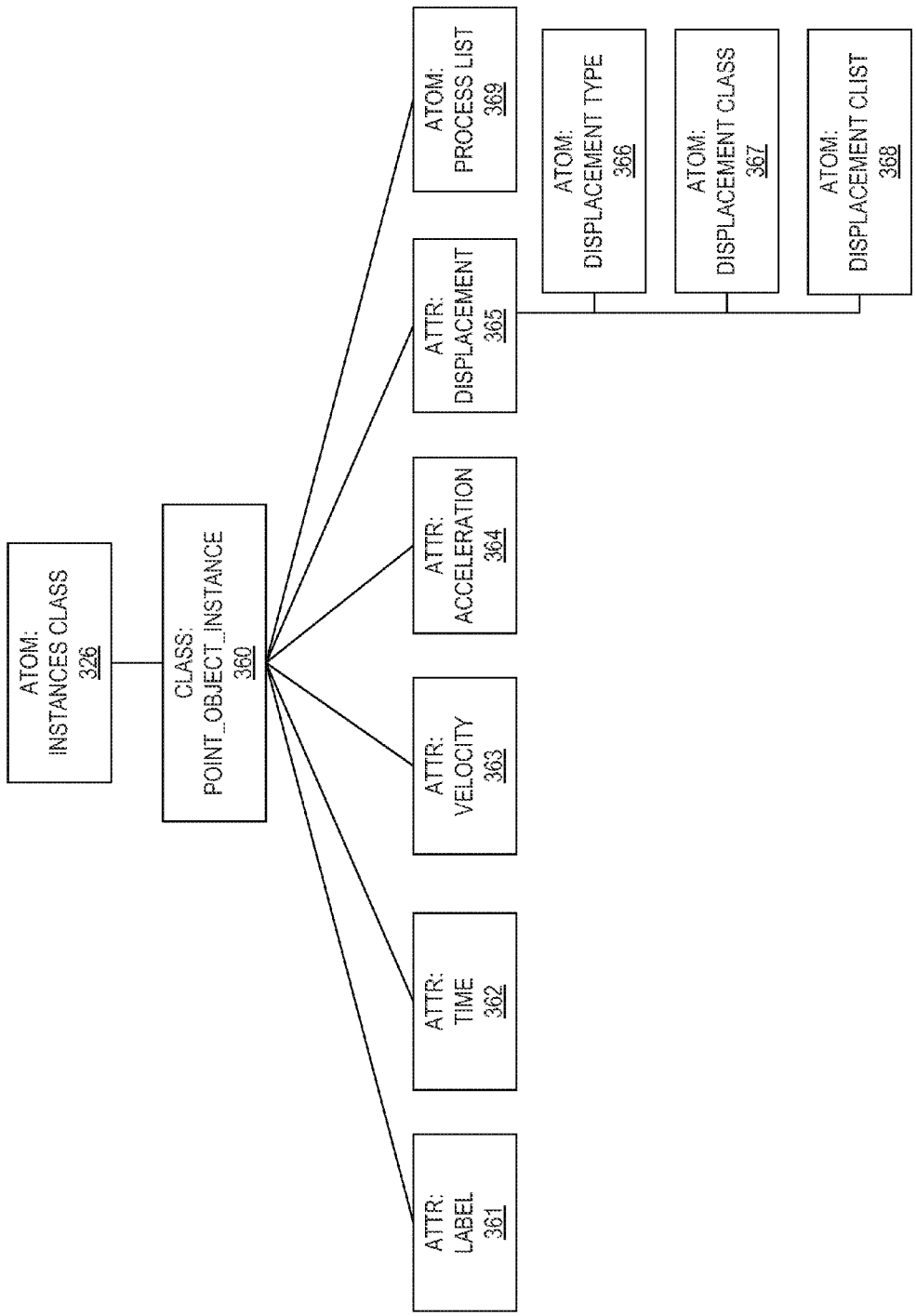

The point object kinematics example continues in FIG. 3D. In FIG. 3D, instances Class 326 from FIG. 3B is further described in terms of the model. An instance of class 326 is shown as point object instance 360. Several attributes of instance 360 are shown, including label 361, time 362, velocity 363, acceleration 364, and displacement 365. Instance 360 also includes process List 369. Displacement attribute 365 is an Encapsulation with associated atoms displacement type 366, displacement class 367 and displacement constraint list 368.

Figure 3E:
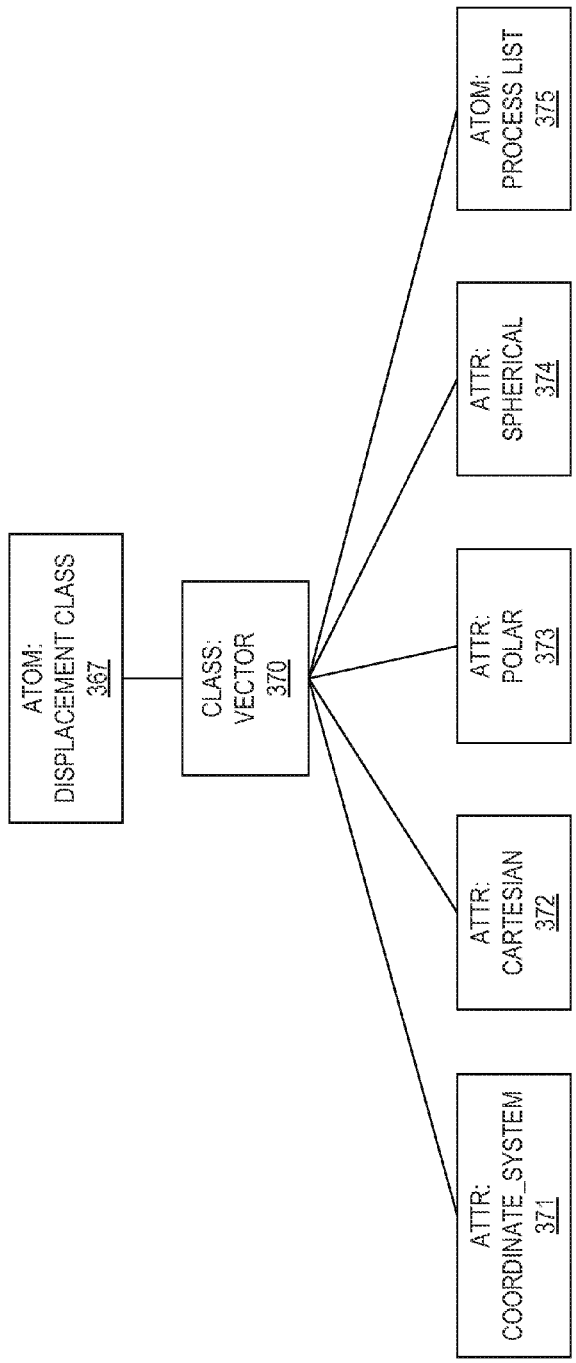

The exemplary embodiment of point object kinematics continues in FIG. 3E. The displacement class atom 367 from FIG. 3D is further described in terms of the Model. Vector class 370 is an element of displacement class 367. Vector class 370 is associated with Attributes coordinate system 371, Cartesian 372, polar 373, and spherical 373. Vector class 370 is also associated with its process list 375.

Figures 3F, 3G:
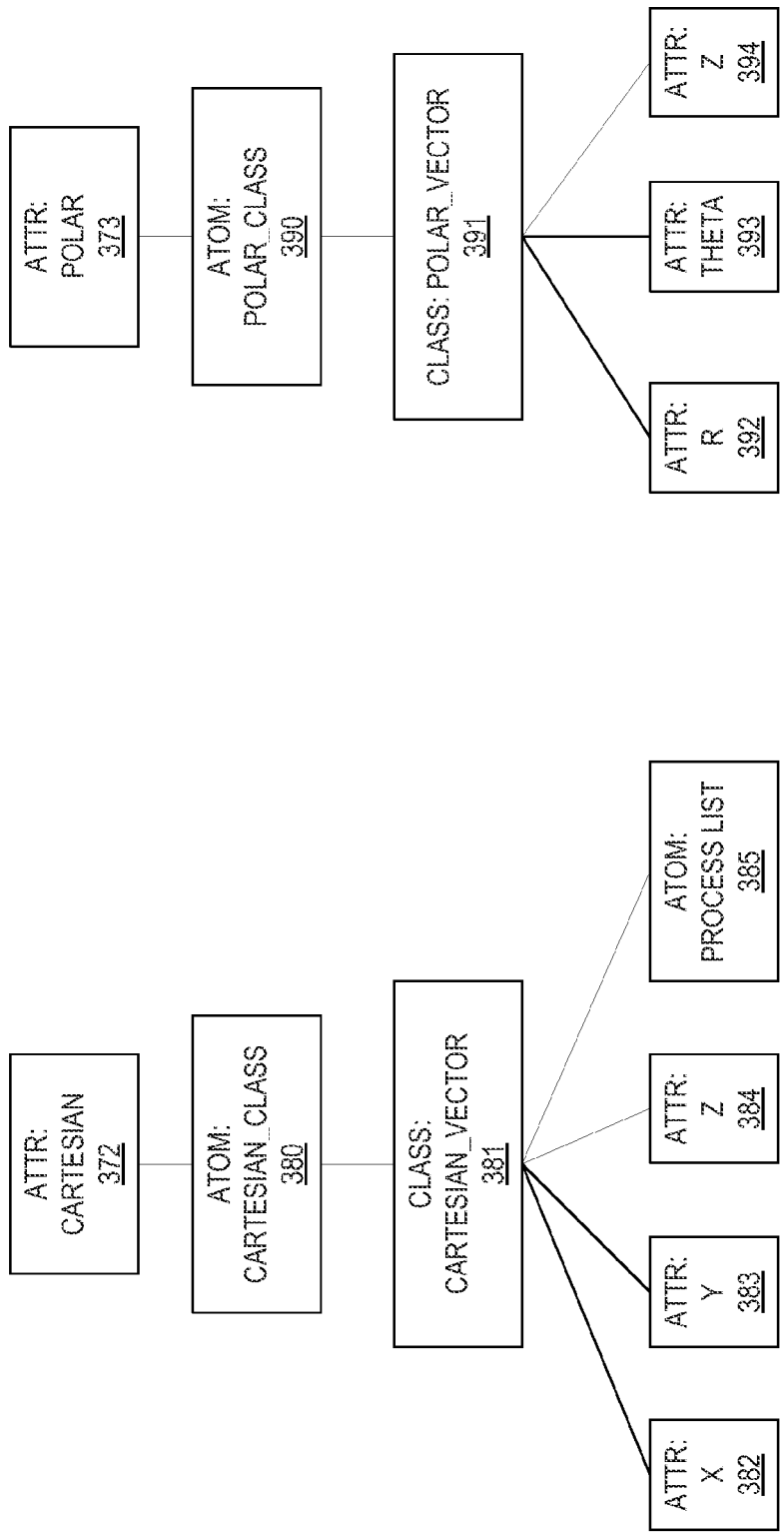

Further details of the exemplary point object kinematics embodiment are shown in FIG. 3F. FIG. 3F shows components and associations of Cartesian Attribute 372 and FIG. 3G shows components and associations of polar Attribute 373, both from FIG. 3E. In FIG. 3F, Cartesian Attribute 372 is associated with Cartesian class 380 which is associated with Cartesian vector class 381. Cartesian vector class 381 is associated with a process List 385 and X Attribute 382, Y Attribute 383, and Z Attribute 384. In FIG. 3G, Polar Attribute 373 is associated with Polar Class atom 390 which is associated with polar vector class 391. Polar vector class 391 is associated with R Attribute 392, theta Attribute 393, and Z Attribute 394.

One approach to conducting discovery is now described. FIG. 4A-1 describes the class structure for a company. This structure tracks data on various aspects of a company, such as purchases, contracts and sales. We wish to know whether there exist any correlations between one set of data and another. These correlations are commonly referred to as association rules and is a standard structure within knowledge discover and data mining.

Figure 4B:
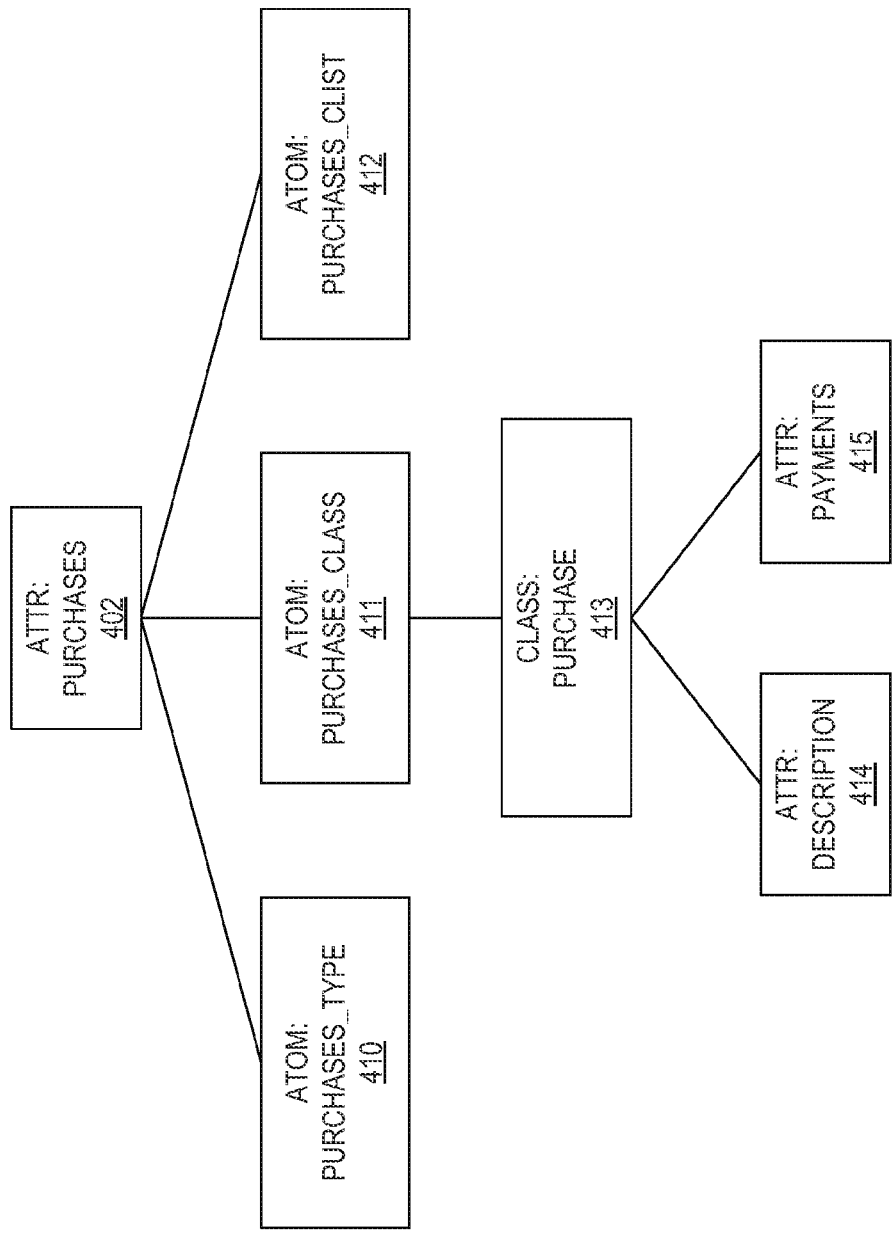
Figure 4F:
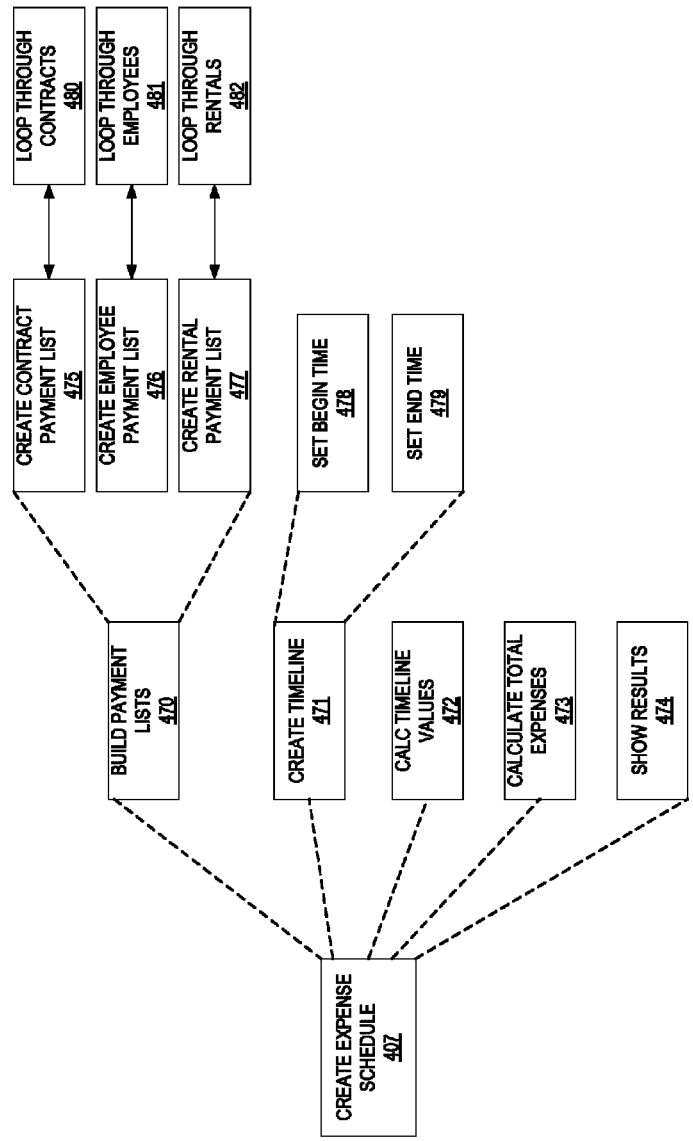
Figure 5A:
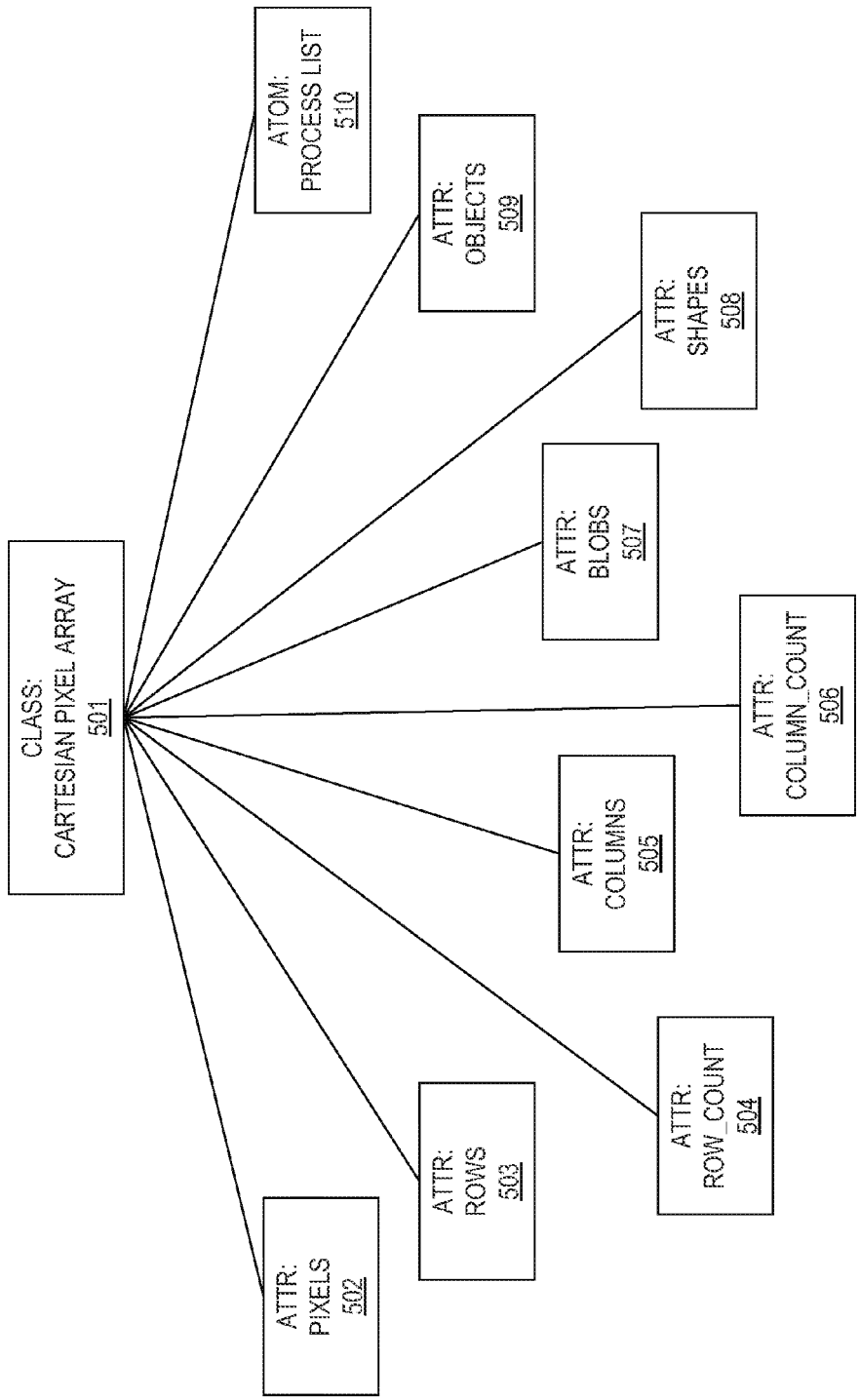
FIGS. 5A-5E illustrate an embodiment of the present invention applied to the domain of identification of objects in an array of single-value pixels.
Figures 2, 5B:
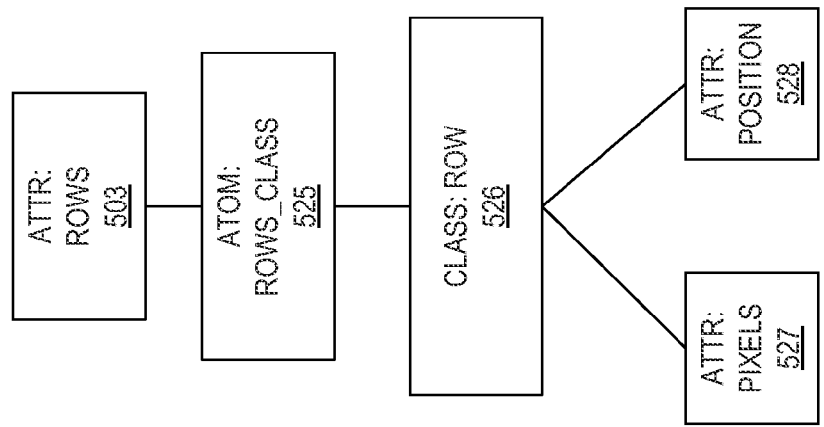
Figures 1, 5B:
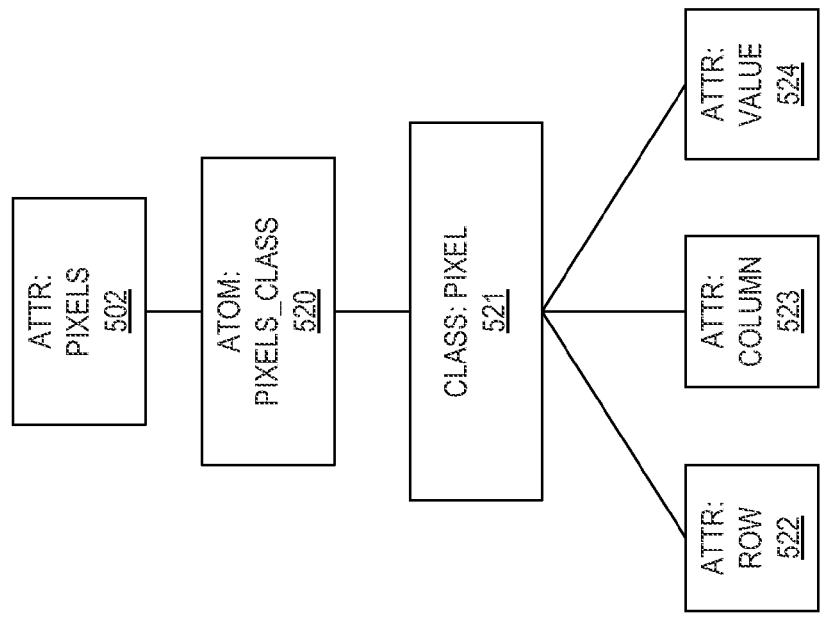

Referring now to FIGS. 4A-1 and 4A-2, an embodiment of the present invention is depicted as being applied to the domain of operations of a business. This illustrates the ability of the Unit Model to represent entities such as a person or a company. It also illustrates representation of abstract relationships between entities such as employer/employee and contracts. Two top-level classes are shown, class company 400 in FIG. 4A-1 and class company sales 450 in FIG. 4A-2. Class company 400 has attributes useful in modeling the exemplary domain. Attribute name 401, attribute purchases 402, attribute contracts 403, attribute employees 404, and attribute rentals 405 are all aspects of class company 400. Company class 400 also is associated with process List 406, which includes an illustrative process create expense schedule 407. Process 407 is further detailed in FIG. 4F.

Still referring to FIG. 4A-2, company sales class 450 is associated with attributes name 451 and projected sales 452. Class 450 is also associated with process List 453. FIGS. 4B, 4C, 4D, and 4E provide further details of the business operation example through expanding the definition of selected elements introduced in FIGS. 4A-1 and 4A-2.

FIG. 4B provides details of purchases attribute 402 defined in FIG. 4A-1. Purchases attribute 402 is associated with purchases type 410, purchases class 411, and purchases CList 412. Purchases class 411 is associated with purchase class 413, which has Attributes of description 414 and payment 415.

Figure 4C:
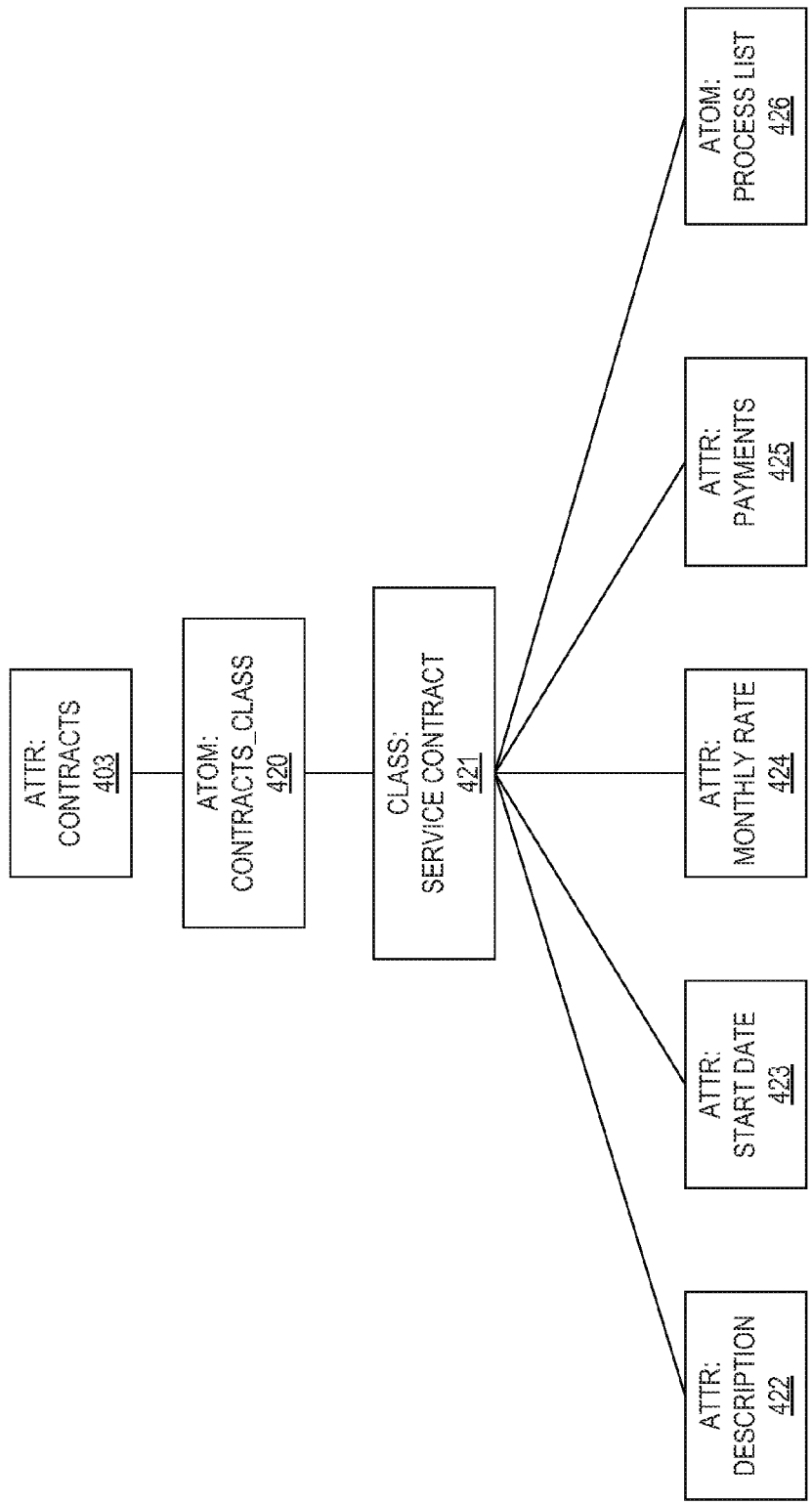

FIG. 4C provides details of contracts attribute 403 defined in FIG. 4A-1. Contracts attribute 403 is associated with contracts class atom 420. Contracts class atom 420 is associated with service contract class 421, which has Attributes of description 422, start date 423, monthly rate 424, and payments 425. Class service contract 421 is also associated with process List 426.

Figure 4D:
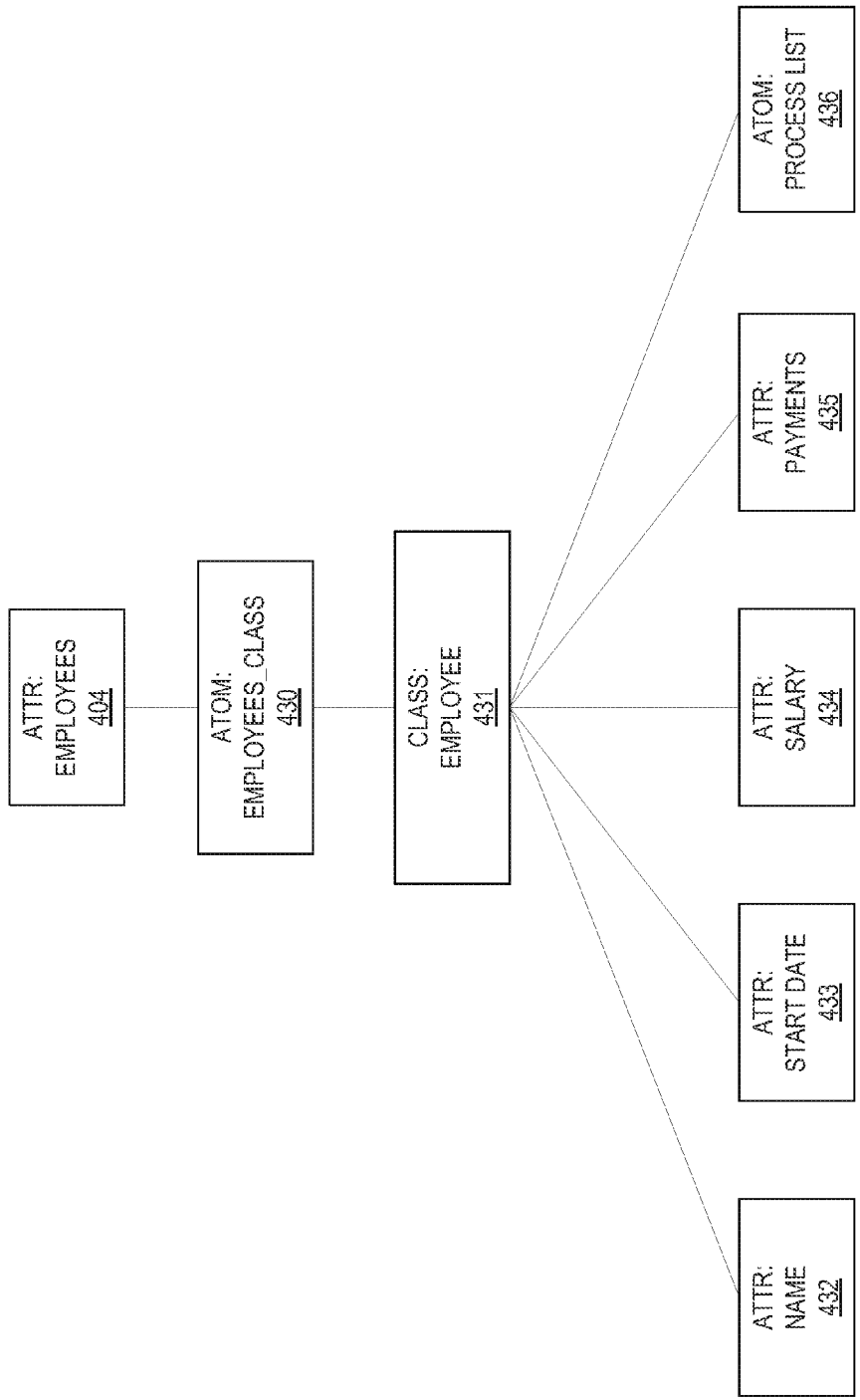

FIG. 4D provides details of employees attribute 404 defined in FIG. 4A-1. Employees attribute 404 is associated with employees class atom 430. Employees class atom 430 is associated with employee class 431, which has Attributes of name 432, start date 433, salary 434, and payments 435. Class employee 431 is also associated with process List 436.

Figure 4E:
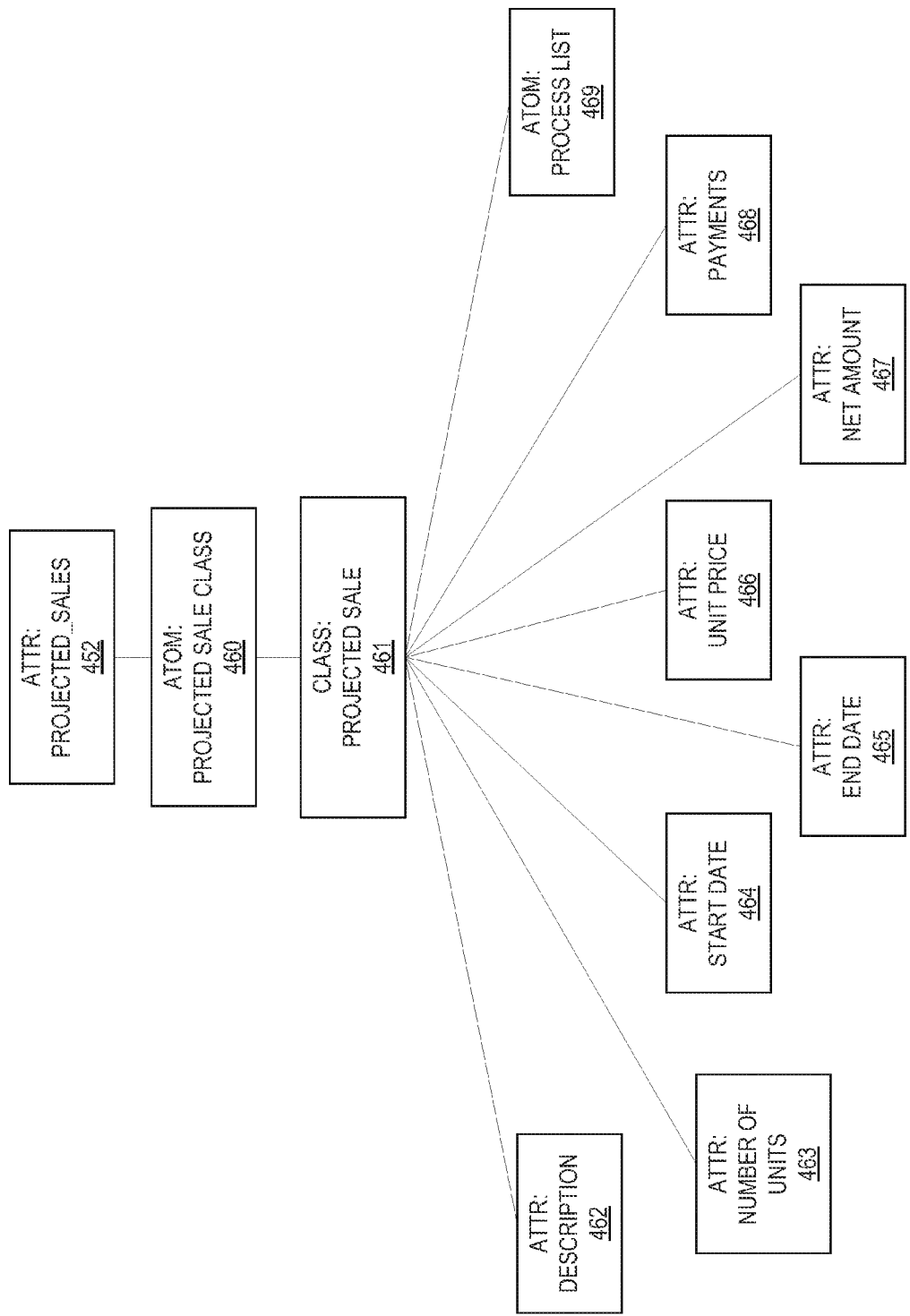

FIG. 4E provides details of projected sales attribute 452 defined in FIG. 4A-2. Projected sales attribute 452 is associated with projected sale class atom 460. Projected sale class atom 460 is associated with projected sale class 461, which has Attributes of description 462, number of units 463, start date 464, end date 465, unit price 466, net amount 467, and payments 468. Class projected sale 461 is also associated with process List 469.

Referring now to FIG. 4F, details of create expense schedule process 407 from FIG. 4A-1 are provided. Process 407 is comprised of a sequence of steps or operations, and that each step of a process may in itself be a sequence of operations. Thus it is possible to use the Unit Model to describe complex, layered, and multi-tiered processes. Referring to FIG. 4F, process 407 comprises five steps 470, 471, 472, 473, and 474. In turn, process 470 comprises three steps 475, 476, and 477. Process 471 comprises two steps 478 and 479. Processes may also contain detailed operations, loops, or conditional decisions. Process 475 includes loop 480. Process 476 includes loop 481. Process 477 includes loop 482.

FIG. 11 defines the process 477 of FIG. 4F. The process has 4 parameters in step 1101. A variable [CurrentDate] is defined in step 1102 and is set to the [BeginDate] parameter in step 1103. If the [CurrentDate] is less than the [EndDate] parameter in step 1104 then create an instance of the Payment class in step 1105. The new class instance is the target of the copying unit. In step 1106, the target is identified as {New Payment}. Curly brackets indicates that an element is referencing a target of another unit. Attributes of the Payment instance are set in step 1107, the [CurrentDate] is incremented by 30 days in step 1108 and the Payment instance is added to the [Payments] in step 1109.

FIGS. 5A-5E illustrate an embodiment of the present invention applied to the domain of identification of objects in an array of monochrome pixels. This illustrates the capability of the model to discover patterns and relationships in data. In FIG. 5A, Cartesian Pixel array class 501 is at the top level, and comprises a two-dimensional array of picture elements or pixels. Array 501 has several Attributes associated, including pixels Attribute 502, rows Attribute 503, row_count attribute 504, columns Attribute 505, column_count Attribute 506, blobs attribute 507, shapes Attribute 508, and Objects Attribute 509. Process List 510 is also associated with class 501.

FIG. 5B-1 provides further details of pixels attribute 502 previously defined in FIG. 5A. Pixels attribute 502 is associated with pixels class atom 520. Pixels class atom 520 is associated with pixel class 521, which has Attributes of row 522, column 523, and value 524.

FIG. 5B-2 provides further details of rows attribute 503 previously defined in FIG. 5A. Rows attribute 503 is associated with rows class atom 525. Rows class atom 525 is associated with row class 526, which has Attributes of pixels 527, and position 528. Any Class in an instantiation of a model may have many attributes and sub-classes that are not shown. Similarly, attributes may be added or modified as part of adjusting, expanding or maintaining an instance of a model or in response to changes in the domain being modeled. For example, details of rows Attribute 503 are shown but column attribute 505 has similar attributes. Thus the details of exemplary embodiments are intended to be illustrative of the Model capability rather than exhaustive.

Figure 5C:
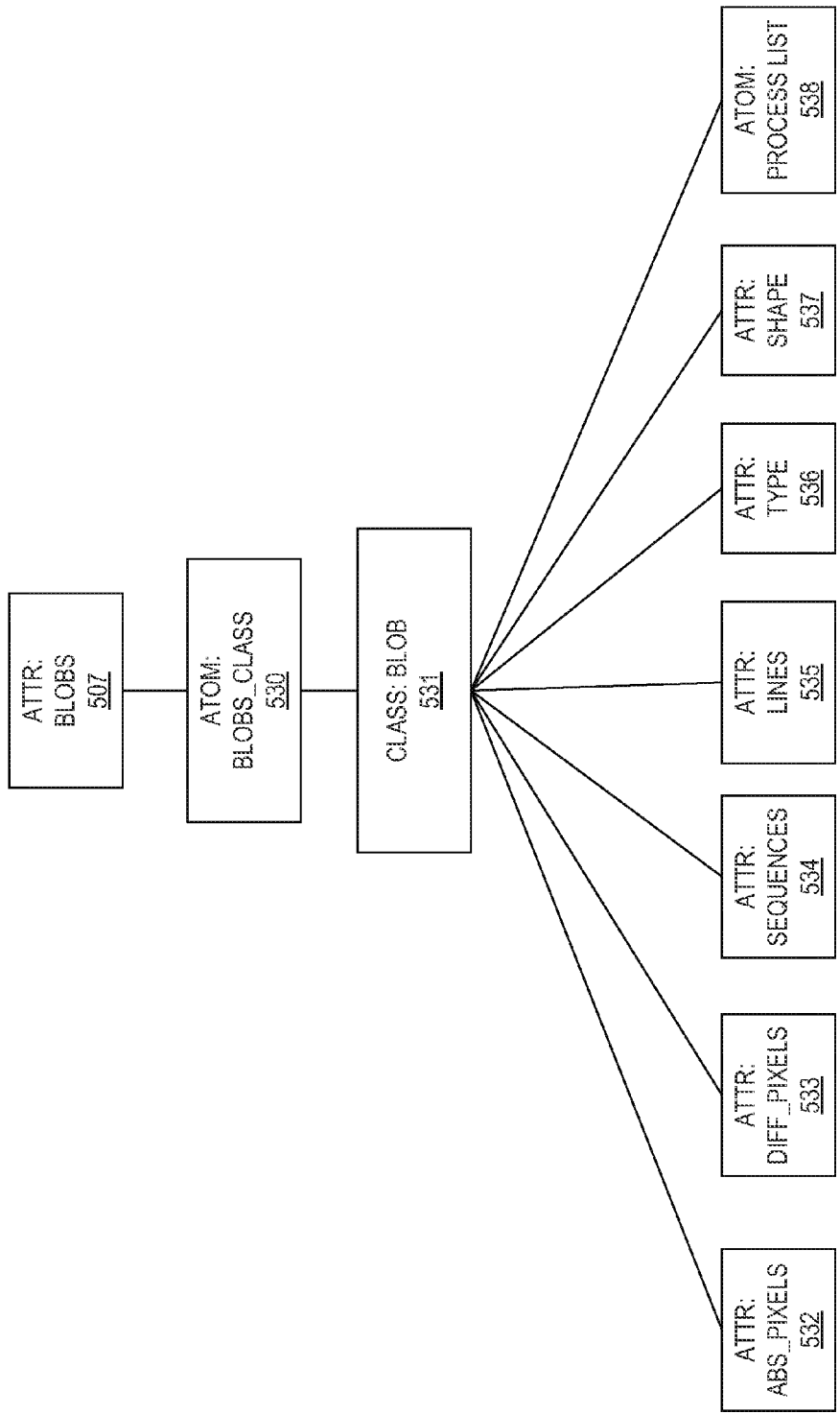

FIG. 5C provides further details of blobs attribute 507 previously defined in FIG. 5A. Blobs attribute 507 is associated with blob class atom 530. Blobs class atom 530 is associated with blob class 531, which has Attributes of absolute pixels 532, differential pixels 533, sequences 534, lines 535, type 536, and shape 537. Blobs class 531 also has process list 538 associated.

Figure 5D:
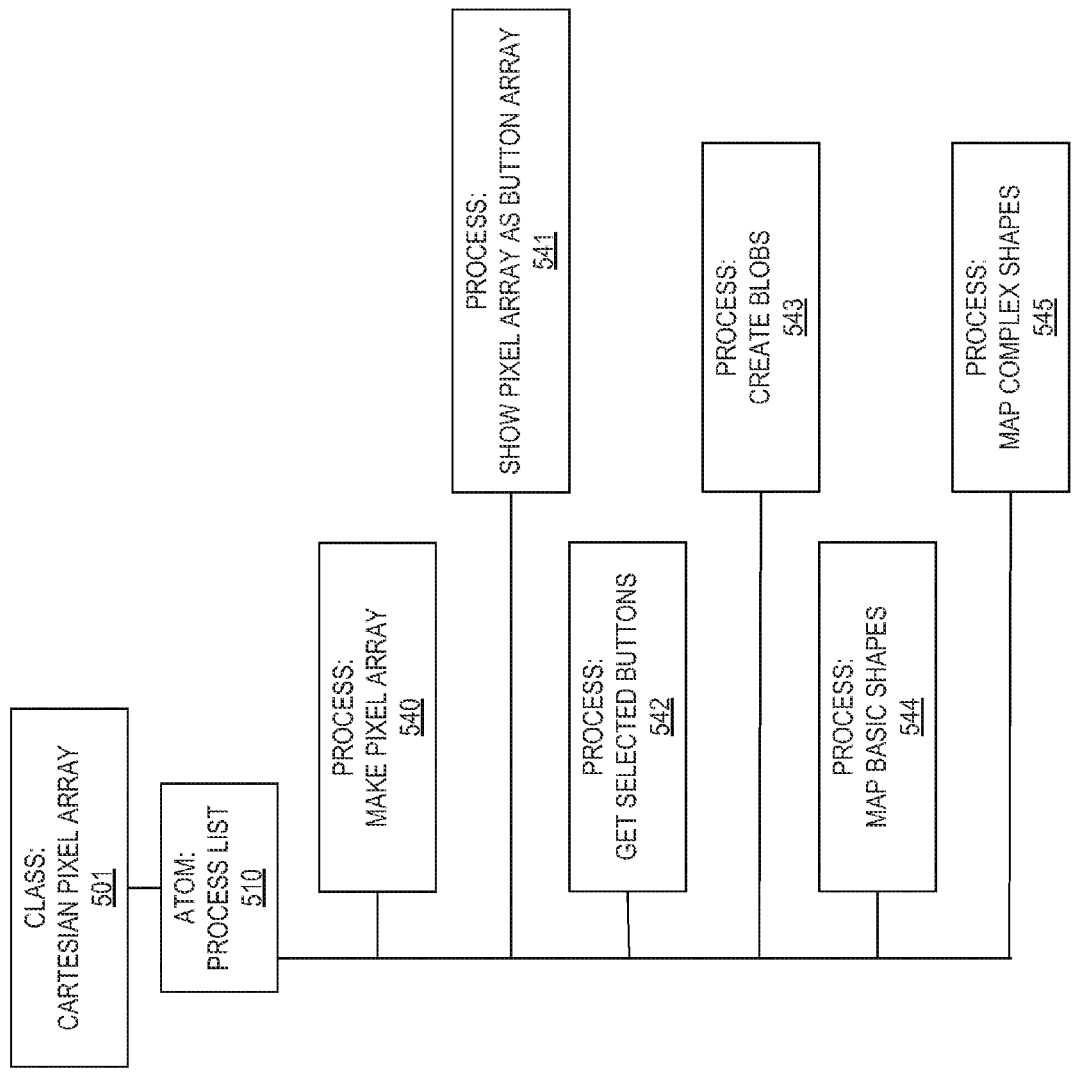

FIG. 5D illustrates processes used by class 501. In FIG. 5A class 501 was shown to be associated with process List 510. In FIG. 5D several processes that are elements of process List 510 are shown. Process 540 makes a pixel array. Process 541 shows a pixel array as a button array. Process 542 gets selected buttons. Process 543 creates blobs. Process 544 maps basic shapes. Process 545 maps complex shapes.

Figure 5E:
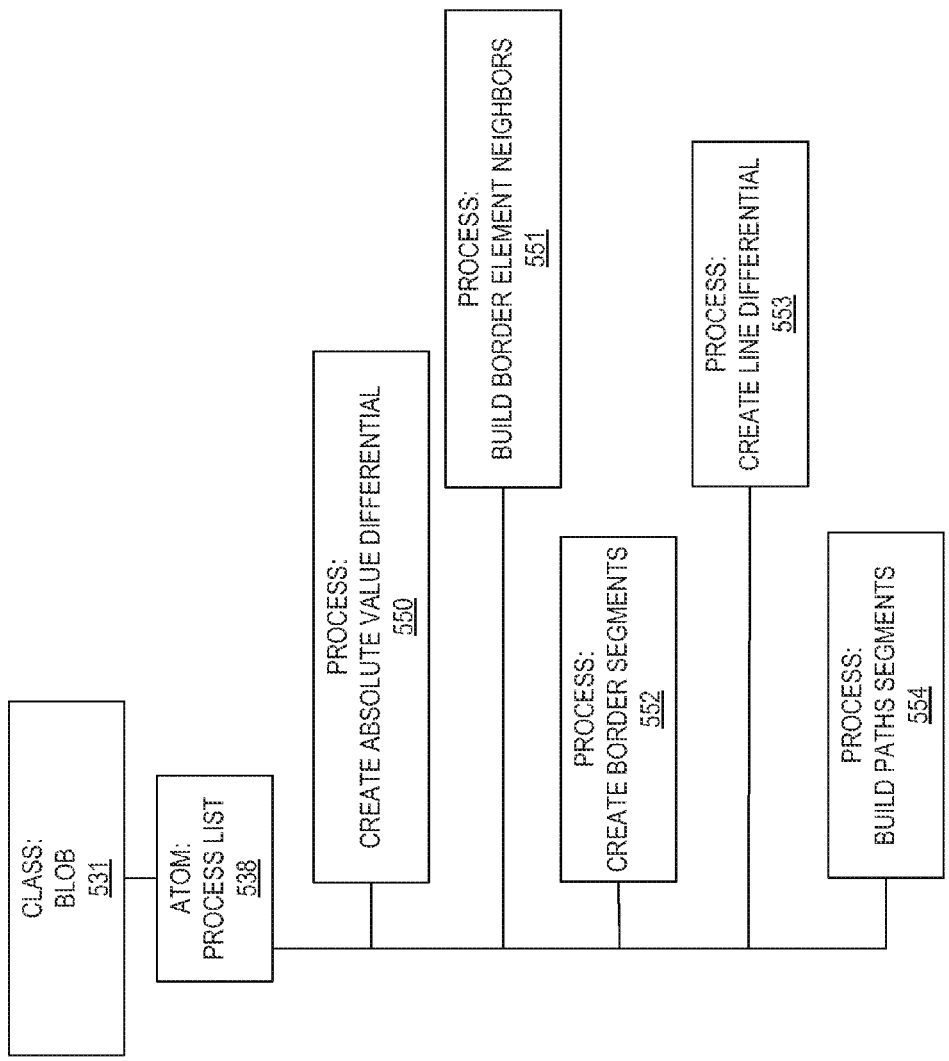

FIG. 5E illustrates processes used by blob class 531. In FIG. 5C class 531 was shown to be associated with process List 538. In FIG. 5E several processes that are elements of process List 531 are shown. Processes 550, 551, 552, 553, and 554 perform processes needed by class 531.

Models may generally be designed to describe a large number of real/observed situations. The composite sum of all real situations actually described in the model is referred to as a data domain. Relations may exist between certain sets of data and other sets of data, perhaps these sets of data all have values in some numerical range. Units or sets of units may be identified as source and target domains. It is a straightforward process for one skilled in the art to find the set of all theoretically possible map steps that link the source to the target units. Therefore embodiments of the system of the present invention may autonomously discover new knowledge. Therefore it can be requested of the unit model to discover these principles and even the classes and attributes to which the principles will apply. This process is referred to as Discovery. Other common names exist for this process, including Knowledge Discovery and Data Mining.

Figure 9:
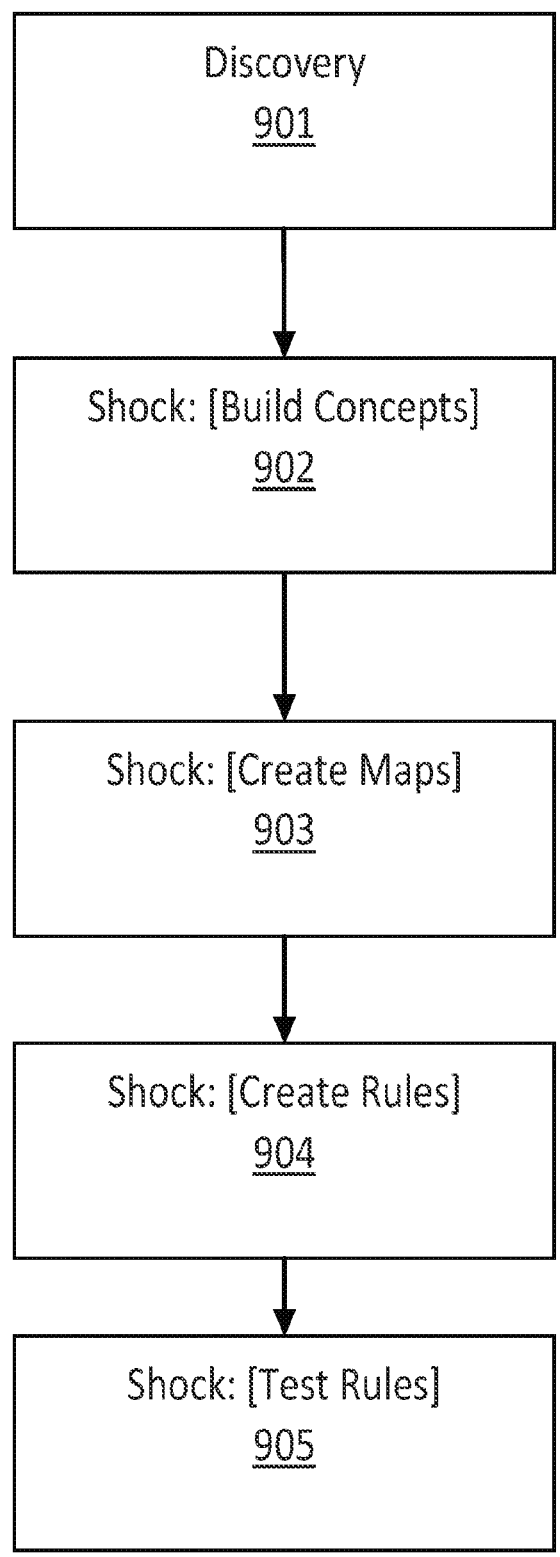
FIG. 9 shows a flow chart describing an embodiment of the present invention relating to Discovery.
Figure 10:
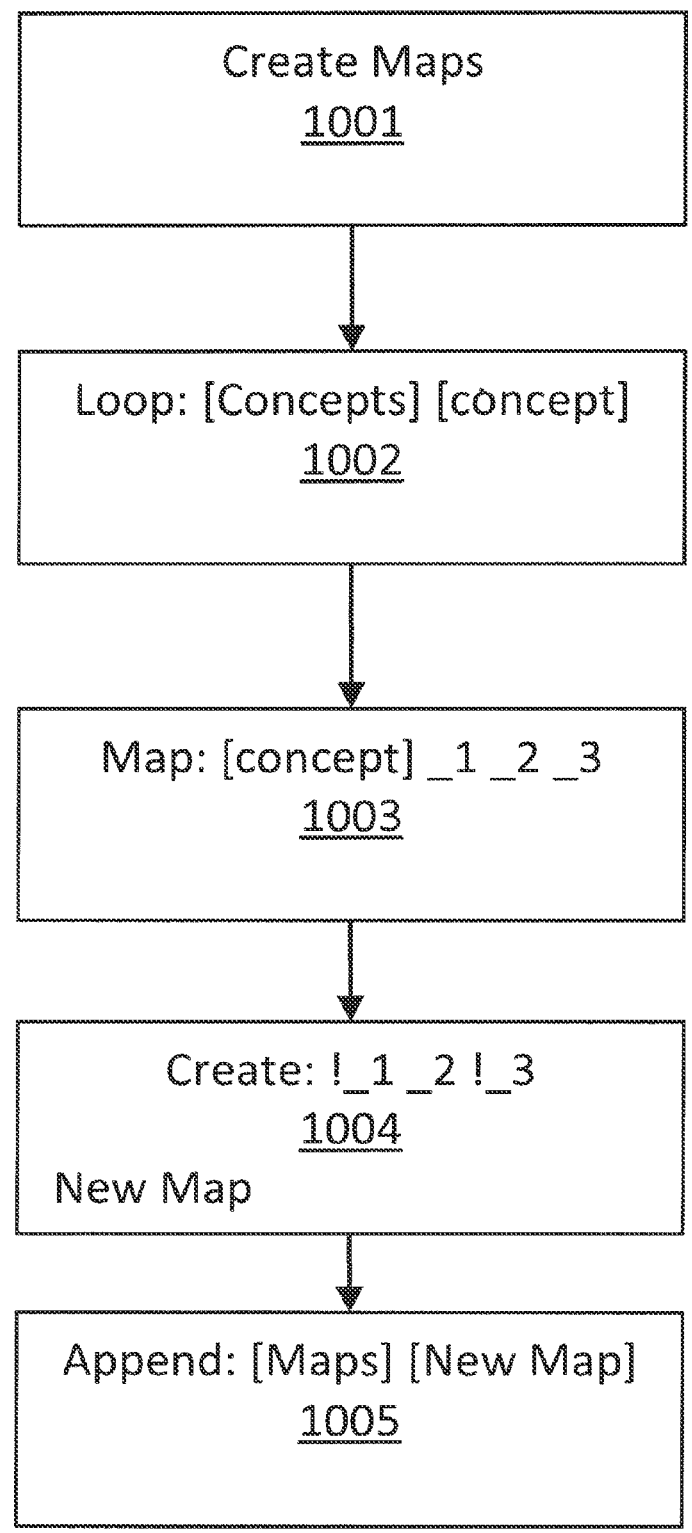
FIG. 10 shows a flow chart describing a mapping process according to one embodiment of the present invention.

The flow chart diagram of FIG. 9 describes a possible implementation of a discovery process. The discovery process is initiated by shocking the process Discovery (step 901). In step 902, a process is shocked that will create a list of units which represent all of the paths that describe the domain. The elements of each unit would be [source] relation [destination]. A process is then shocked in step 903 to create a set of .maps (map: _1, _2, _3). The process may create a map for each potential possibility, e.g. _1 relation1 _2, [source1] _1 _2, etc. . . . Create Maps 903, defines a process to create a map of the form _1 relation _2 for every concept in the concept list. A '_1 _2 _3' map is applied to each concept and then a new unit is created whose elements are set to !_1 _2 !_3. The ! indicates that the element is being defined as _1 versus using the contents of _1. An implementation of a mapping process is shown in FIG. 10, showing the steps of creating maps 1001, by looping through a list of concepts in step 1002, with each concept in step 1003 resulting in a new reference to each concept in step 1004 as a new map that in step 1005 is appended to existing maps. Returning to FIG. 9, in step 904 a process is shocked which combines all, or a subset of, all of the combinations of maps into antecedent and consequential associations. A rule class is copied which has attributes of antecedents, consequences and metrics. In step 905, a process is shocked to test the rule. The test process may keep track of any set of metrics for the rule and store the results in attributes of a rule class instance's metrics attributes.

It is easily conceived how variations of the described processes could make them more general and complex. For example, the number of antecedents of a rule could be much greater than one, and the combination of virtual units in the map could be more numerous and general.

In addition to particular domains or Universes, it is also contemplated that the system of the present invention may be implemented without restriction to particular domains. Thus, in one embodiment an object is instantiated comprising the encapsulation of all Situations experienced and encapsulation of all pleasure and pain values. This object is referred to as the "self".

In one embodiment, a situation is instantiated called S_self which observes the Self object and regulates it toward a goal. In one embodiment the goal is to seek pleasure and avoid pain. It may be observed that this goal reflects a primary drive of conscious beings. With further refinement, including the addition of stimulus and possibly other goals, more complex behaviors may be generated. It is thus possible with this embodiment to further research into the nature and operation of artificial intelligence.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A system for knowledge representation and application development comprising:
    a processor;
    a memory unit coupled to the processor;
    a plurality of information units stored in the memory units, the information units including:
        an information unit element or set of information unit elements that reference at least one separate information unit, either directly or indirectly;
        an operator that defines one of a plurality of actions the information unit performs when it is shocked or activated; and
        at least one path that describes a relationship that exists between the information unit and a separate information unit; and
    a dynamic engine module executable by the processor for shocking or activating the operator of an information unit and causing further shocks, or activations, to flow to separate information units to which the shocked information unit is connected via a path, and wherein the information units and the paths embody a knowledge representation schema, the information unit model, whereby an instantiation or instance of the information unit model refers to a particular collection and assembly of model elements to correspond to at least one of a domain, a set of observations, actual knowledge and data.

2. The system of claim 1, wherein an object or a set of objects having similar characteristics at some level of abstraction is represented by a set of an unlimited number of information units to form a class, and wherein characteristics of a class are represented by a plurality of attributes.

3. The system of claim 2, wherein each attribute of a class represents one of a text string, a list, and a class.

4. The system of claim 2, wherein an original class is copied forming a class instance having a path to the original class.

5. The system of claim 1, wherein the information unit elements reference a set of information units that represents a list.

6. The system of claim 1, wherein a set of information units having paths to each other that direct one or more shocks, or activations, to a predetermined set of information units form a process.

7. The system of claim 1, wherein a plurality of information units are referenced as an encapsulation having a single information unit, and wherein the resultant encapsulation is one of a list, process and class.

8. The system of claim 1, wherein an information unit element is a symbolic element or symbolic sequence for use in a mapping operation.

9. The system of claim 1, wherein each information unit includes a property that indicates a state of relationship of the information unit to a separate information unit when it is shocked or activated.

10. The system of claim 1, wherein the shock, or activation, of the operator enables the selective initiation of a flow of a dynamic property, or energy, through a predetermined set of information units that are connected by the paths.

11. The system of claim 10, wherein each path has a resistance property that controls the flow of energy from one information unit to separate information units when they are shocked or activated.

12. The system of claim 10, wherein each information unit has a threshold property that quantifies the number and/or amount of shocks required to shock, or activate, the operator.

13. The system of claim 10, wherein the flow of energy is directed through a single path to a single destination unit.

14. The system of claim 10, wherein the flow of energy is directed through multiple paths to multiple destination information units.

15. The system of claim 10, wherein the flow of energy achieves a desired result or satisfies a certain goal criteria.

16. The system of claim 1, wherein a computer implementation of the unit model embodies a dynamic engine and a plurality of integrated modules, including a user interface to allow users to control, manipulate and selectively execute functions of the unit model to build models of selected areas of knowledge.

17. The system of claim 16, further comprising a visualization module that graphically displays the unit model.

18. The system of claim 16, further comprising an interface to allow users to store unit models in a database and retrieve the models from a database.

19. The system of claim 16, further comprising an interface to allow users to incorporate the unit model into an external computer program.

20. The system of claim 1, wherein at least one of the information units includes a truth value including one of a binary number and a non-binary real value representing a property of the information unit.

21. The system of claim 1, wherein at least one of the information units includes a desirability factor including one of an integer or a real-valued property corresponding to a desirability of an information unit relative to other information units.

22. A system for knowledge representation and application development comprising:
   a processor;
   a memory unit coupled to the processor;
   a plurality of information units stored in the memory units, the information units including an operator that defines one of a plurality of actions the information unit performs when it is shocked or activated, and at least one path that describes a relationship that exists between the information unit and a separate information unit; and
   a dynamic engine module executable by the processor for shocking or activating the operator of an information unit and causing further shocks, or activations, to flow to separate information units to which the shocked information unit is connected via a path, and wherein the information units and the paths embody a knowledge representation schema, the information unit model, whereby an instantiation or instance of the information unit model refers to a particular collection and assembly of model elements to correspond to at least one of a domain, a set of observations, actual knowledge and data.

23. The system of claim 22, wherein at least one of the information units includes an information unit element or set of information unit elements that reference at least one separate information unit, either directly or indirectly.

* * * * *